United States Patent
Shankar et al.

(10) Patent No.: US 12,038,946 B1
(45) Date of Patent: Jul. 16, 2024

(54) MINIMIZING CONNECTION LOSS WHEN CHANGING DATABASE QUERY ENGINE VERSIONS

(71) Applicant: Amazon Technologies, Inc., Seattle, WA (US)

(72) Inventors: Ramesh Shankar, Redmond, WA (US); Raman Mittal, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/194,579

(22) Filed: Mar. 31, 2023

(51) Int. Cl.
*G06F 16/23* (2019.01)
*G06F 16/27* (2019.01)

(52) U.S. Cl.
CPC .......... *G06F 16/27* (2019.01); *G06F 16/2329* (2019.01)

(58) Field of Classification Search
CPC .... G06F 16/27; G06F 16/2329; G06F 16/273; G06F 16/275; G06F 16/278
See application file for complete search history.

(56) References Cited

U.S. PATENT DOCUMENTS

| | | | |
|---|---|---|---|
| 10,013,248 B2 | 7/2018 | Buzsaki et al. | |
| 10,275,832 B1 * | 4/2019 | Seybold | G06Q 40/08 |
| 10,303,665 B2 | 5/2019 | Engelko et al. | |
| 10,452,646 B2 | 10/2019 | Schlarb et al. | |
| 10,482,080 B2 | 11/2019 | Auer et al. | |
| 10,713,277 B2 | 7/2020 | Auer et al. | |
| 11,461,192 B1 * | 10/2022 | Brahmadesam | G06F 11/2048 |
| 11,561,864 B1 * | 1/2023 | Brahmadesam | G06F 16/214 |
| 2017/0344618 A1 * | 11/2017 | Horowitz | G06F 16/27 |
| 2022/0300483 A1 * | 9/2022 | Singh | G06F 16/2474 |

* cited by examiner

*Primary Examiner* — Merilyn P Nguyen
(74) *Attorney, Agent, or Firm* — S. Scott Foster; Kowert, Hood, Munyon, Rankin & Goetzel, P.C.

(57) ABSTRACT

Connection loss may be minimized for performing database query engine changes. A distributed database system may include different instances of the query engine that provide access to a database. When an event to change the version of the query engine is detected, a copy of the database may be created and a new instance of the query engine created. Read-only access to the database may be maintained using the different instances of the query engine while the new instance may be upgraded to the different version of the query engine. Upon successful installation of the different version of the query engine at the new instance, the new instance may be given read-write access to the database using the copy of the database and other database instances may be upgraded to the different version of the query engine.

20 Claims, 13 Drawing Sheets

MINIMIZING CONNECTION LOSS WHEN CHANGING DATABASE QUERY ENGINE VERSIONS

BACKGROUND

Commoditization of computer hardware and software components has led to the rise of service providers that provide computational and storage capacity as a service. At least some of these services, such as database services, are implemented in distributed fashion in order to provide durability and availability of data. In this way, workloads for client applications can be distributed amongst multiple components of a distributed database system in order to provide consistent performance.

Figure 1A:
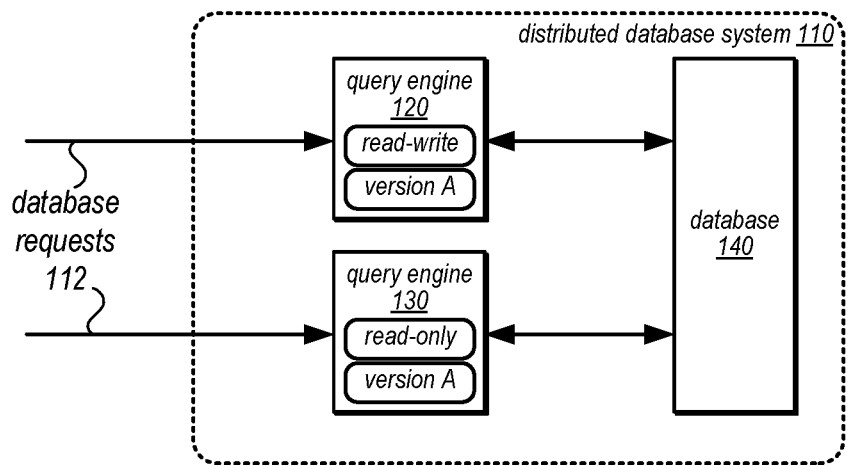
FIGS. 1A-1D are logical block diagrams illustrating minimizing connection loss when changing database query engine versions, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

Various embodiments of minimizing connection loss when changing database query engine versions are described herein. The development lifecycle of an application, including query engines that perform queries and handle other interactions with a database, may introduce many different versions of the application. Some version changes may introduce new features. For a query engine, new features may include supporting new operators, functions, or other query performance enhancements. Other version changes may resolve bugs, errors, or other problematic behavior in earlier versions. For a query engine, such errors may include improving poorly performing data retrieval or processing operations, or may resolve bugs that cause query engine restarts or other issues that result in query failure. Given the different features and performance of different versions of an application, it is desirable to allow versions of an application, like a query engine, to be changed.

Version changes for a query engine may be hampered by distributed implementations of a database system that includes a query engine. For example, multiple query engines may be involved in accessing database data. If a version of one of the query engines is changed to be different than other query engine versions, the differing versions may be unable to operate together. Interface changes, such as changes to an Application Programming Interface (API), or other interaction between query engines (and other distributed database system components), can degrade or cause failures between query engines communicating using different versions of an interface. Likewise, some query engine version changes may involve changes to system data for the distributed database system, such as changes to schema information for a database or other metadata that is used by query engines in order to access the database and interact with other query engines. When the system data is (at least in part) incomprehensible to one query engine because of a query engine version change, then that query engine may be unable to correctly access database data or interact with another query engine.

Moreover, some architectural implementations of distributed database systems may introduce further complications to the performance of version changes. For example, different types of replication, such as cross region replication discussed below, may be performed for database changes. A query engine implemented in one location may obtain access to database changes differently than a query engine implemented in another location. Therefore, version change techniques that fail to account for the type of replication implemented for database changes when performing query version changes may suffer from one of the scenarios described above, provide access to an incorrect version of database data in some locations, or perform a version change at an inopportune time (e.g., as low workload time, such as late evening in one region, may be a high workload time, such as mid-day in another region).

As query engines may maintain connections with client applications in order to receive and respond to various database access requests (e.g., queries), poorly executed version changes which fail to account for the characteristics of a distributed database system can result in connection loss between a client application and a database. For many applications, loss of database access as a result of dropped connections and failed attempts or slow completion of reconnection to a database can degrade or stop client applications from executing. Therefore, techniques that can minimize or prevent connection loss in version changes for query engines of a distributed database system can improve the reliability and availability of the database itself and of client applications which depend upon access to the database.

FIGS. 1A-1D are logical block diagrams illustrating minimizing connection loss when changing database query engine versions, according to some embodiments. In FIG. 1A, distributed database system 110 may be a stand-alone database system (e.g., implemented on private network systems or services or implemented by a user of a cloud or other provider network, like the provider network discussed in detail below with regard to FIG. 2). In some embodiments, distributed database system 110 may be database service, like database service 210 discussed in detail below with regard to FIGS. 2-7D, which may be implemented and managed by a provider network. Distributed database system 110 may be one of many different types of database, including types that support different kinds of access to database data, such as through the use of a query language like Structured Query Language (SQL) or APIs or other commands that provide a NoSQL interface. Different types of databases may store data for the database in different formats and according to different data models. For instance, one type of database may use a relational data model that imposes a common schema for a table of the relational database and another type of database may use a non-relational data model that imposes a flexible schema, which may not be common across different items or objects in the database. Databases may store various types of data including, but not limited to, graph databases storing data using a graph data model, time series databases storing time series data, key-value database that use a unique key-value to lookup data objects of various data types or formats in the database, or document databases that store data as a document with varying attributes, including nested data.

Distributed database 110 may store database 140 in a storage system which may be attached or accessible to query engines 120 and 130. In some embodiments, a non-distributed storage system may be implemented to store database 140. In other embodiments, database 140 may be stored in a distributed data storage system, such as storage service 220 discussed below with regard to FIGS. 2-7D. Query engines, such as query engine 120 and 130 may be implemented as instances, nodes, or other independent applications that can be independently updated to a different version, in various embodiments. For instance, as discussed below with regard to FIG. 3, query engines can be implemented as instances on respective host systems. In some embodiments, these host systems may be distributed (e.g., in different data centers or other different locations, such as on different server racks) so as to avoid common failure scenarios where both host systems may have correlated or simultaneous failure.

As depicted in FIG. 1A, query engines 120 and 130 may have respectively assigned roles for handling database requests 112. Such roles may include a read-write role, which allows for performing requests 112 that both read from and write to database 140, and read-only, which may perform requests 112 that read from database 140. Also depicted in FIG. 1A, is an application version of each query engine. For both query engine 120 and 130, version A of the query engine is installed and executing.

Figure 1B:
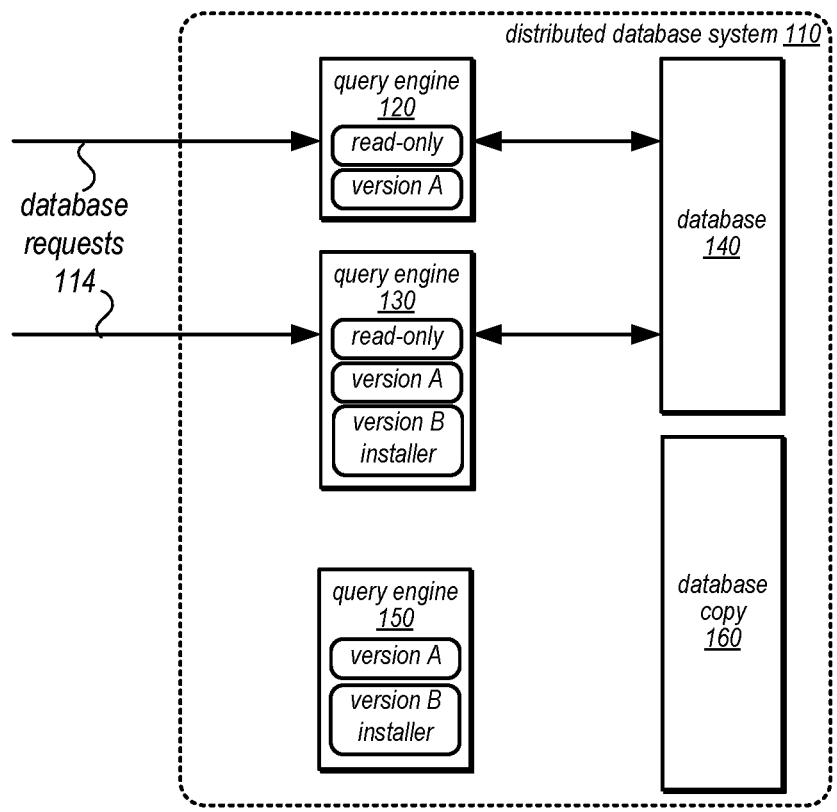

As new or different versions of a query engine become available, an event to perform a query engine version change may be detected, in various embodiments. For example, a request, such as an upgrade configuration request depicted in FIG. 7A, or other instruction specifying a maintenance window or other desirable time period for performing query engine version change may be specified. Which version of the query engine to change to may also be specified, in some embodiments. Once detected, version change performance may begin. As illustrated in FIG. 1B, query engine 120 may have its role changed to read-only. In this way, access to database 140 may be modified so that only those requests in database requests 114 that read from database 140 may be performed. Write requests (e.g., to insert, delete, or modify data), may not be performed and may rejected with an error message.

A database copy 160 may be created from database 140. This database copy 160 can be created in different ways. For instance, a new entire copy can be created in a same (or different) storage system. In some embodiments, a copy-on-write technique may be implemented to create database copy 160 may be performed where portions of database copy 160 may point to portions of database copy 140 and only be changed when written (which depending on when database copy 160 is created may or may not occur once query engine 120 becomes read-only). As discussed above, it may be the case that version changes of a query engine may include changes to database data, such as system data. Therefore, the copy-on-write technique may include those changes in database copy 160 when performed. Also depicted in FIG. 1B, is the distribution of the different version of the query engine, version B, to query engine 130 and query engine 150 as version B installer (e.g., an executable or other instructions to modify a currently installed query engine version to implement version B or remove a currently installed query engine version (e.g., version A) and then install version B).

Figure 1C:
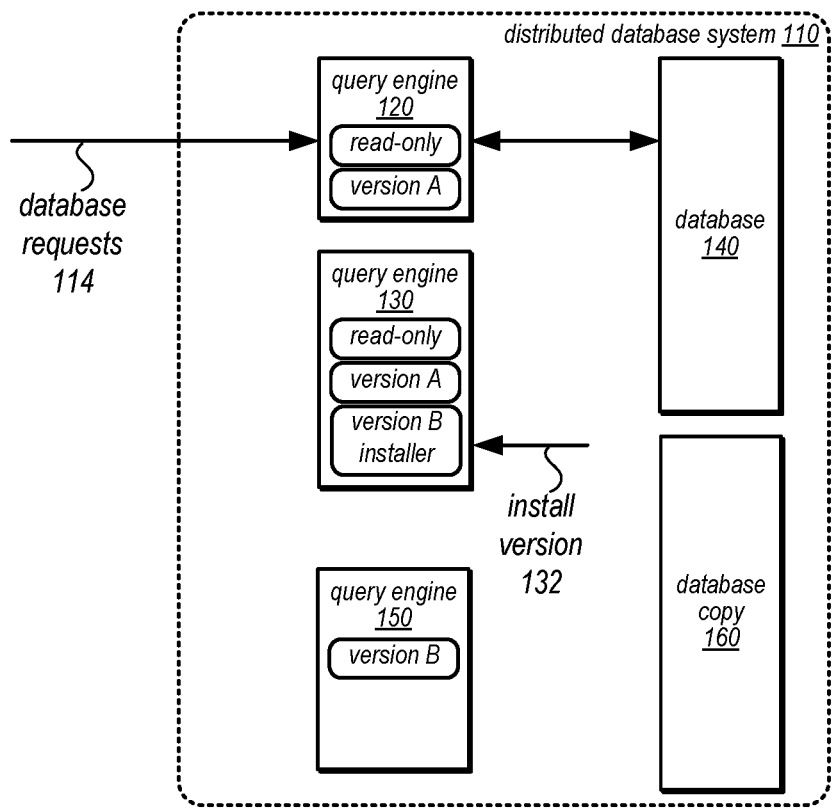

As depicted in FIG. 1C, version B has successfully been installed at query engine 150. If not, then the version change may be aborted or rolled back, as discussed below with regard to FIGS. 7A-8. An instruction 132 to install version B may be sent to query engine 130 to execute version B installer. This instruction 132 may be sent from a control plane component, such as query engine upgrade management 342 as discussed below with regard to FIG. 7C, directly from query engine 150, or from some other component of distributed database system 110 not illustrated). Note that in FIG. 1C, query engine 120 may still provide access to database 140 and continue performing database requests 114. This technique prevents complete lack of access to database 140. Although not depicted, query engine 130 may also continue to provide access to database 140 (although there may be a brief period of unavailability when performing install version 132 according to the installation techniques used).

Figure 1D:
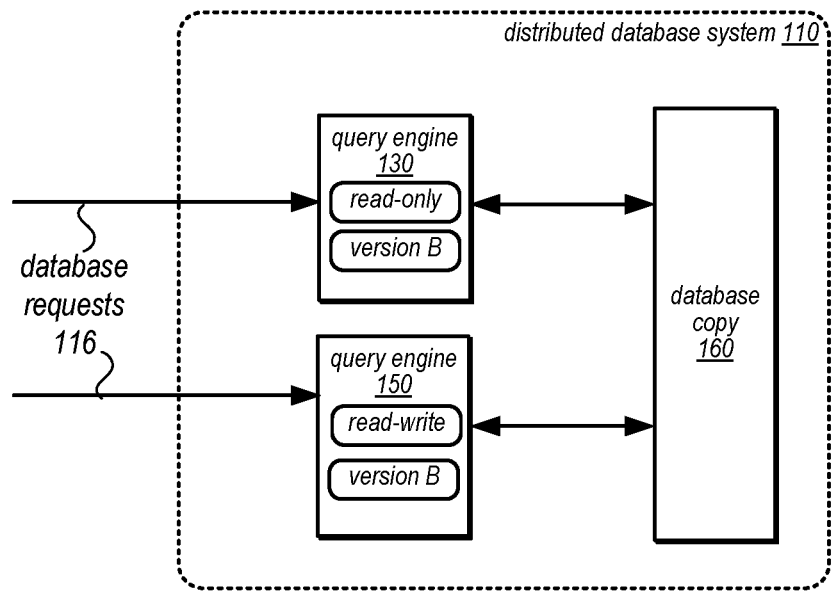

As illustrated in FIG. 1D, once query engine 150 has successfully installed version B, query engine 150 may be assigned read-write access to database copy 160. Database requests 116 may be redirected (e.g., either by a client application, load-balancer or other network traffic shaping component, or a proxy which may maintain connections with a database client so that when requests are redirect the connection with the database client does not have to be reestablished) to query engine 150 instead of query engine 120. Because database copy 160 is used, any changes to database data as a result of the version change are present in the database copy and compatible with both query engine 150 and query engine 130, which may resume providing read-only access to the database using database copy 160. The techniques discussed above may minimize connection loss to a database, as components may be available to continue to handle access requests to the database whether through query engine 120 or ultimately through query engine 150. Because both the original 140 and copy of the database 160 are used, compatibility issues between different versions of a query engine according to different system data do not occur as a switch between copies of the database is made when using the compatible version of the query engine. While changes in connection to the database may occur when, for example, moving from query engine 120 to query engine 150, the time of connection loss may be minimized to perform a reconnection technique using a different location (e.g., initiating a connection with the network address for query engine 150) or can, in some embodiments, be eliminated if a proxy is used to establish connections with database clients (and it is the proxy which reestablishes a connection with query engine 150). For query engine 130, in some embodiments, connections may be preserved over the installation of the new query version using some installation techniques.

Please note, FIGS. 1A-1D are provided as logical illustrations of a distributed database system and its respective components, as well as respective interactions and is not intended to be limiting as to the physical arrangement, size, or number of components, modules, or devices to implement such features. For example, cross region replication techniques may also involve changes in query engine versions which may make use of the techniques discussed above as described in more detail below with regard to FIGS. 7A-7D.

The specification continues with an example network-based database service implemented as part of a provider network that performs minimizing connection loss when changing database query engine versions. Included in the description of the example database service are various aspects of the example database service, such as a database instance, and a separate storage service. The specification then describes flowcharts of various embodiments of methods for minimizing connection loss when changing database query engine versions. Next, the specification describes an example system that may implement the disclosed techniques. Various examples are provided throughout the specification.

Figure 2:
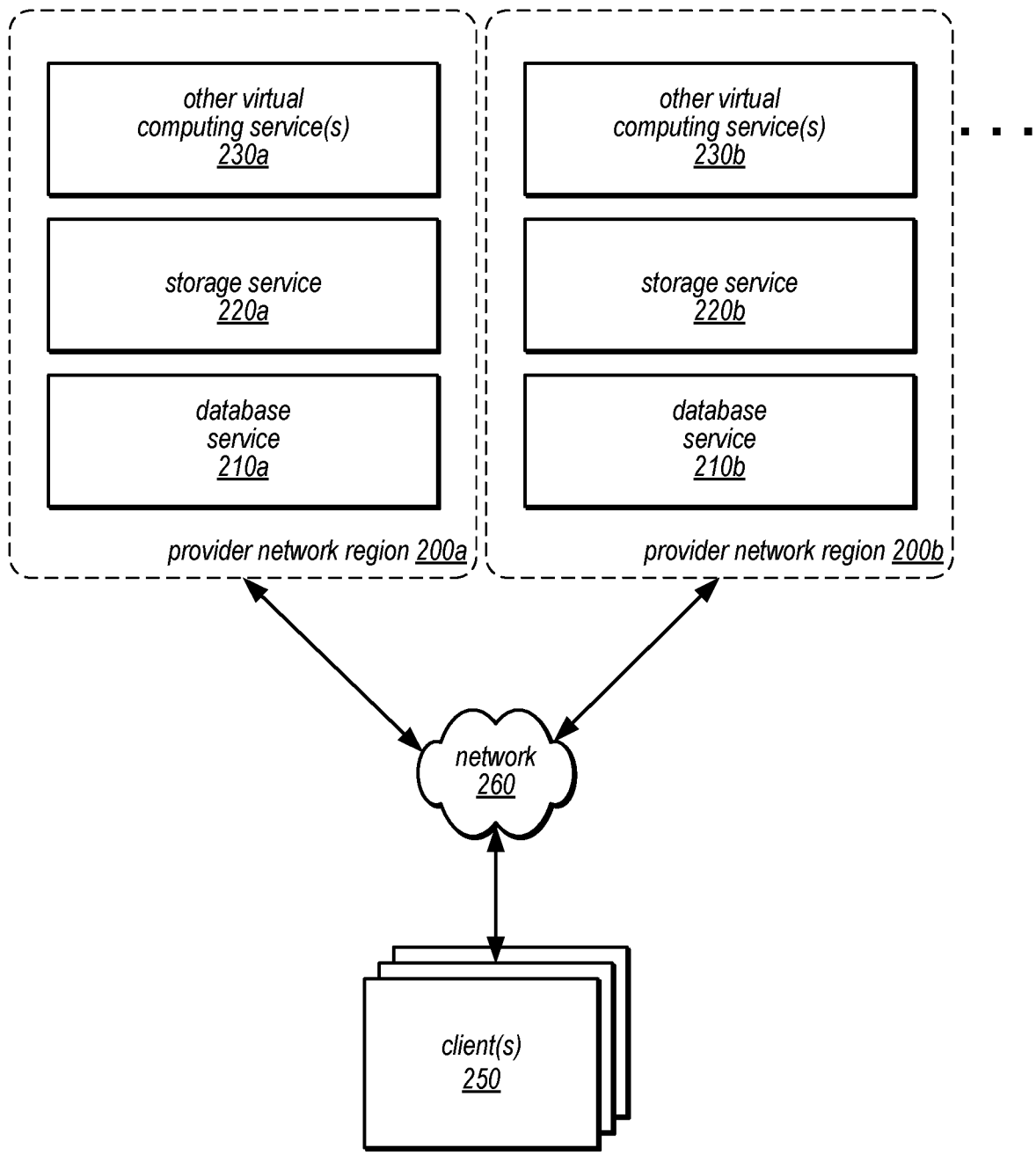
FIG. 2 is a block diagram illustrating provider network regions that may implement database services that implement techniques for minimizing connection loss when changing database query engine versions, according to some embodiments.

FIG. 2 is a block diagram illustrating provider network regions that may implement database services that implement techniques for minimizing connection loss when changing database query engine versions, according to some embodiments. A provider network (sometimes referred to as a "cloud provider network" or "cloud") refers to a pool of network-accessible computing resources (such as compute, storage, and networking resources, applications, and services), which may be virtualized or bare-metal. The provider network can provide convenient, on-demand network access to a shared pool of configurable computing resources that can be programmatically provisioned and released in response to user commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Users can connect to availability zones of the provider network via a publicly accessible network (e.g., the Internet, a cellular communication network) by way of a transit center (TC). TCs can be considered as the primary backbone locations linking users to the provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network connecting each region to at least one other region. The provider network may deliver content from points of presence outside of, but networked with, these regions by way of edge locations and regional edge cache servers (points of presence, or PoPs). This compartmentalization and geographic distribution of computing hardware enables the provider network to provide low-latency resource access to users on a global scale with a high degree of fault tolerance and stability.

The provider network may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the provider network, which may be provisioned in user accounts.

The traffic and operations of the provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the cloud provider network (e.g., computing instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

As depicted in FIG. 2, an exemplary provider network may include numerous provider network regions 220a, 220b, and so on that may include one or more data centers hosting various resource pools, such as collections of physical and/or virtualized computer servers, storage devices, networking equipment and the like (e.g., computer system 1000 described below with regard to FIG. 9), needed to implement and distribute the infrastructure and storage services offered by the provider network within the provider network regions 200.

In the illustrated embodiment, a number of clients (shown as clients 250) may interact with a provider network 200 via a network 260. Provider network may implement respective instantiations of the same (or different) services, a database service 210a for region 200a and database service 210b for region 200b, a storage service 220a for region 200a and storage service 220b for region 220b, as well as various other virtual computing services 230a and 230b respectively. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit network-based services requests to one or more of provider network regions 200a or 200b via network 260, including requests for database services. For example, a given client 250 may include a suitable version of a web browser, or may include a plug-in module or other type of code module may execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more database tables. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with service of a region of a provider network. In some embodiments, client 250 may generate network-based services requests according to a Representational State Transfer (REST)-style web services architecture, a document- or message-based network-based services architecture, or another suitable network-based services architecture. Although not illustrated, some clients of provider network 200 services may be implemented within a service of the provider network (e.g., a client application of database service 210a may be implemented on one of other virtual computing service(s) 230a in region 200a), in some embodiments. Therefore, various examples of the interactions discussed with regard to clients 250 may be implemented for internal clients as well, in some embodiments.

In some embodiments, a client 250 (e.g., a database service client) may be may provide access to network-based storage of database data to other applications in a manner that is transparent to those applications. For example, client 250 may be may integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model, as described above. Instead, the details of interfacing to the provider network may be coordinated by client 250 and the operating system or file system on behalf of applications executing within the operating system environment.

Clients 250 may convey network-based services requests to and receive responses from a region of the provider network via network 260. In various embodiments, network 260 may encompass any suitable combination of networking hardware and protocols necessary to establish network-based communications between clients 250 and provider network regions 200a and 200b. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and the provider network region may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network regions 200a and 200b. It is noted that in some embodiments, clients 250 may communicate with regions of a provider network using a private network rather than the public Internet. For example, clients 250 may be provisioned within the same enterprise as a database service. In such a case, clients 250 may communicate with a provider network region entirely through a private network 260 (e.g., a LAN or WAN that may use Internet-based communication protocols but which is not publicly accessible).

Generally speaking, provider network regions 200a and 200b may implement one or more service endpoints may receive and process network-based services requests, such as requests to access a database (e.g., queries, inserts, updates, etc.) and/or manage a database (e.g., create a database, configure a database, etc.). For example, a provider network region may include hardware and/or software may implement a particular endpoint, such that an HTTP-based network-based services request directed to that endpoint is properly received and processed. In one embodiment, a provider network region may be implemented as a server system may receive network-based services requests from clients 250 and to forward them to components of a system that implements database service 210a or 210b, storage service 220a or 220b and/or another virtual computing service 230a or 230b for processing. In other embodiments, provider network region may be configured as a number of distinct systems (e.g., in a cluster topology) implementing load balancing and other request management features may dynamically manage large-scale network-based services request processing loads. In various embodiments, a provider network region may be may support REST-style or document-based (e.g., SOAP-based) types of network-based services requests.

In addition to functioning as an addressable endpoint for clients' network-based services requests, in some embodiments, a provider network region may implement various client management features. For example, provider network region 200a may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Provider network regions may also implement financial accounting and billing systems, or may maintain a database of usage data that may be queried and processed by external systems for reporting and billing of client usage activity. In certain embodiments, provider network regions may collect, monitor and/or aggregate a variety of storage service system operational metrics, such as metrics reflecting the rates and types of requests received from clients 250, bandwidth utilized by such requests, system processing latency for such requests, system component utilization, such as the target capacity determined for individual database engine head node instances, network bandwidth and/or storage utilization, rates and types of errors resulting from requests, characteristics of stored and databases (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210a or 210b, storage service 220a or 220b and/or another virtual computing service 230a or 230b (or the underlying systems that implement those services).

In some embodiments, provider network regions may also implement user authentication and access control procedures. For example, for a given network-based services request to access a particular database table, a provider network region ascertain whether the client 250 associated with the request is authorized to access the particular database table. Provider network regions may determine such authorization by, for example, evaluating an identity, password or other credential against credentials associated with the particular database table, or evaluating the requested access to the particular database table against an access control list for the particular database table. For example, if a client 250 does not have sufficient credentials to access the particular database table, the provider network region may reject the corresponding network-based services request, for example by returning a response to the requesting client 250 indicating an error condition. Various access control policies may be stored as records or lists of access control information by database services 210a or 210b, storage services 220a or 220b and/or other virtual computing services 230a or 230b.

Note that in many of the examples described herein, services, like database service or storage service may be internal to a computing system or an enterprise system that provides database services to clients 250, and may not be exposed to external clients (e.g., users or client applications). In such embodiments, the internal "client" (e.g., database service 210a) may access storage service 220a over a local or private network (e.g., through an API directly between the systems that implement these services). In such embodiments, the use of storage service 220a in storing database tables on behalf of clients 250 may be transparent to those clients. In other embodiments, storage services 220a or 220b may be exposed to clients 250 through provider network region 200a or 200b to provide storage of database tables or other information for applications other than those that rely on database service 210a or 210b for database management. In such embodiments, clients of the storage service 220a or 220b may access storage service 220a or 220b via network 260 (e.g., over the Internet). In some embodiments, a virtual computing service 230a or 230b may receive or use data from storage service 220a or 220b (e.g., through an API directly between the virtual computing service 230a or 230b and storage service 220a or 220b) to store objects used in performing computing services 230a or 230b on behalf of a client 250. In some cases, the accounting and/or credentialing services of provider network region may be unnecessary for internal clients such as administrative clients or between service components within the same enterprise.

Figure 3:
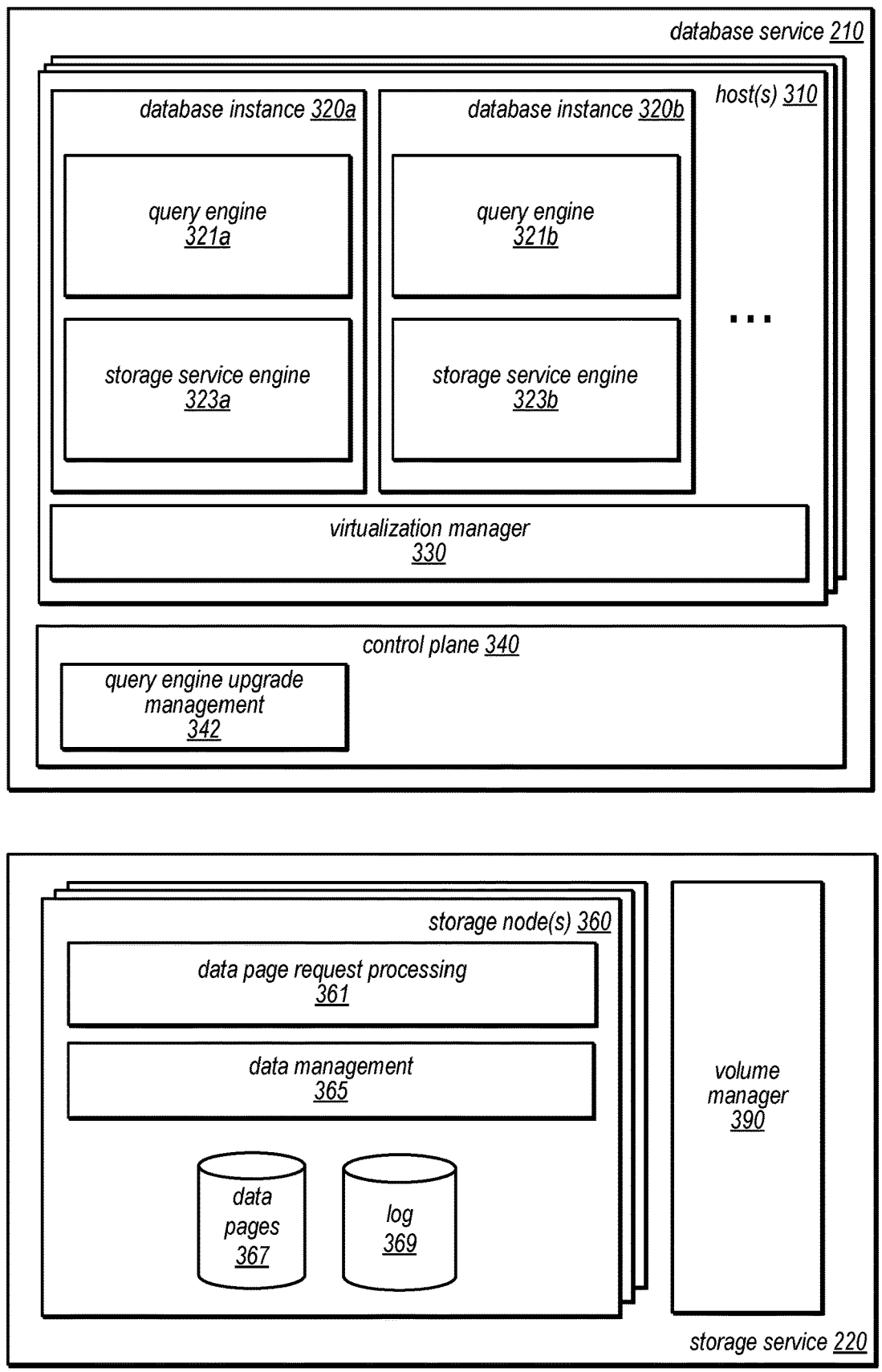
FIG. 3 is a block diagram illustrating various components of a database service and storage service that host databases accessible to database clients, according to some embodiments.

FIG. 3 is a block diagram illustrating various components of a database service and storage service that provides access to a database, according to some embodiments. Database service 210 (instantiated as database service 210a in region 200a and 210b in region 200b) may implement control plane 340 which may manage the creation, provisioning, deletion, or other features of managing a database hosted in database service 210. For example, control plane 340 may monitor the performance of host(s) 310 (e.g., a computing system or device like computing system 1000 discussed below with regard to FIG. 9) for high workloads (e.g., heat) and move or redirect placement of database engine head node instances away from some hosts to avoid overburdening host(s) 310. Control plane 340 may handle various management requests, such as request to create databases, manage databases (e.g., by configuring or modifying performance, such as by enabling a "serverless" or other automated management feature in response to a request which may cause in-place resource scaling to be enabled for that database. Control plane 340 may direct placement of database engine head node instances on host(s) 310 so as to distribute workload across host(s) 310 to avoid failure scenarios, like out-of-memory scenarios. As discussed in detail below with regard to FIGS. 7A-8, control plane 340 may implement query engine upgrade management 342 to implement techniques for minimizing connection loss when changing database query engine versions.

Database service 210 may implement one or more different types of database systems with respective types of query engines for accessing database data as part of the database. For example, database service 210 may implement various types of connection-based (e.g., having established a network connection between a database client and database instance 320) database systems which may, for instance, facilitate the performance of various operations that continue over multiple communications between the database client and the connected database instance 320. In at least some embodiments, database service 210 may be a relational database service that hosts relational databases on behalf of clients.

Database service 210 may implement a fleet of host(s) 310 which may provide, in various embodiments, a multi-tenant configuration so that different database instances, such as database instance 320a and 320b, can be hosted on the same host 310, but provide access to different databases on behalf of different clients over different connections. In some embodiment hosts(s) 310 may not be multi-tenant.

In various embodiments, host(s) 310 may implement a virtualization technology, such as virtual machine based virtualization or container-based virtualization, wherein database instances 320 may be different respective virtual machines, micro virtual machines (microVMs) which may offer a reduced or light-weight virtual machine implementation that retains use of individual kernels within a microVM, or containers which offer virtualization of an operating system using a shared kernel. Host(s) 310 may implement virtualization manager 330, which may support hosting one or multiple separate database engine head node instances 320 as different respective VMs, microVMs, or containers. Virtualization manager 330 may support increasing or decreasing resources made available to host(s) 310 to use for other tasks (including other database instance(s) 320) that were allocated to a database instance 320 upon creation at host(s) 310.

Database instance(s) 320 may support various features for accessing a database, such as query engine(s) 321a and 321b, and storage service engine(s) 323a and 323b discussed in detail below with regard to FIG. 4. Database engine head node instances 320 may implement agents, interfaces, or other controls according to the respective type of virtualization used to collect and facilitate communication of utilization metrics for in-place scaling, among other supported aspects of virtualization.

In some embodiments, database data for a database of database service 210 may be stored in a separate storage service 220. In some embodiments, storage service 220 may be implemented as to store database data as virtual disk or other persistent storage drives. In other embodiments, embodiments, storage service 220 may store data for databases using log-structured storage.

For example, data may be organized in various logical volumes, segments, and pages for storage on one or more storage nodes 360 of storage service 220. For example, in some embodiments, each database may be represented by a logical volume, and each logical volume may be segmented over a collection of storage nodes 360. Each segment, which may live on a particular one of the storage nodes, may contain a set of contiguous block addresses, in some embodiments. In some embodiments, each segment may store a collection of one or more data pages and a change log (also referred to as a redo log) (e.g., a log of redo log records) for each data page that it stores. Storage nodes 360 may receive redo log records and to coalesce them to create new versions of the corresponding data pages and/or additional or replacement log records (e.g., lazily and/or in response to a request for a data page or a database crash). In some embodiments, data pages and/or change logs may be mirrored across multiple storage nodes, according to a variable configuration (which may be specified by the client on whose behalf the databases is being maintained in the database system). For example, in different embodiments, one, two, or three copies of the data or change logs may be stored in each of one, two, or three different availability zones or regions, according to a default configuration, an application-specific durability preference, or a client-specified durability preference.

In some embodiments, a volume may be a logical concept representing a highly durable unit of storage that a user/client/application of the storage system understands. A volume may be a distributed store that appears to the user/client/application as a single consistent ordered log of write operations to various user pages of a database, in some embodiments. Each write operation may be encoded in a log record (e.g., a redo log record), which may represent a logical, ordered mutation to the contents of a single user page within the volume, in some embodiments. Each log record may include a unique identifier (e.g., a Logical Sequence Number (LSN)), in some embodiments. Each log record may be persisted to one or more synchronous segments in the distributed store that form a Protection Group (PG), to provide high durability and availability for the log record, in some embodiments. A volume may provide an LSN-type read/write interface for a variable-size contiguous range of bytes, in some embodiments.

In some embodiments, a volume may consist of multiple extents, each made durable through a protection group. In such embodiments, a volume may represent a unit of storage composed of a mutable contiguous sequence of volume extents. Reads and writes that are directed to a volume may be mapped into corresponding reads and writes to the constituent volume extents. In some embodiments, the size of a volume may be changed by adding or removing volume extents from the end of the volume.

In some embodiments, a segment may be a limited-durability unit of storage assigned to a single storage node. A segment may provide a limited best-effort durability (e.g., a persistent, but non-redundant single point of failure that is a storage node) for a specific fixed-size byte range of data, in some embodiments. This data may in some cases be a mirror of user-addressable data, or it may be other data, such as volume metadata or erasure coded bits, in various embodiments. A given segment may live on exactly one storage node, in some embodiments. Within a storage node, multiple segments may live on each storage device (e.g., an SSD), and each segment may be restricted to one SSD (e.g., a segment may not span across multiple SSDs), in some embodiments. In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes, in some embodiments. In some embodiments, a segment may provide an LSN-type read/write interface for a fixed-size contiguous range of bytes (where the size is defined at creation). In some embodiments, each segment may be identified by a segment UUID (e.g., a universally unique identifier of the segment).

In some embodiments, a page may be a block of storage, generally of fixed size. In some embodiments, each page may be a block of storage (e.g., of virtual memory, disk, or other physical memory) of a size defined by the operating system, and may also be referred to herein by the term "data block". A page may be a set of contiguous sectors, in some embodiments. A page may serve as the unit of allocation in storage devices, as well as the unit in log pages for which there is a header and metadata, in some embodiments. In some embodiments, the term "page" or "storage page" may be a similar block of a size defined by the database configuration, which may typically a multiple of 2, such as 4096, 8192, 16384, or 32768 bytes.

In some embodiments, storage nodes 360 of storage service 220 may perform some database system responsibilities, such as the updating of data pages for a database, and in some instances perform some query processing on data. As illustrated in FIG. 3, storage node(s) 360 may implement data page request processing 361, and data management 365 to implement various ones of these features with regard to the data pages 367 and page log 369 of redo log records among other database data in a database volume stored in log-structured storage service. For example, data management 365 may perform at least a portion of any or all of the following operations: replication (locally, e.g., within the storage node), coalescing of redo logs to generate data pages, snapshots (e.g., creating, restoration, deletion, etc.), clone volume creation, log management (e.g., manipulating log records), crash recovery, and/or space management (e.g., for a segment). Each storage node may also have multiple attached storage devices (e.g., SSDs) on which data blocks may be stored on behalf of clients (e.g., users, client applications, and/or database service subscribers), in some embodiments. Data page request processing 361 may handle requests to return data pages of records from a database volume, and may perform operations to coalesce redo log records or otherwise generate a data pages to be returned responsive to a request.

In at least some embodiments, storage nodes 360 may provide multi-tenant storage so that data stored in part or all of one storage device may be stored for a different database, database user, account, or entity than data stored on the same storage device (or other storage devices) attached to the same storage node. Various access controls and security mechanisms may be implemented, in some embodiments, to ensure that data is not accessed at a storage node except for authorized requests (e.g., for users authorized to access the database, owners of the database, etc.).

Figure 4:
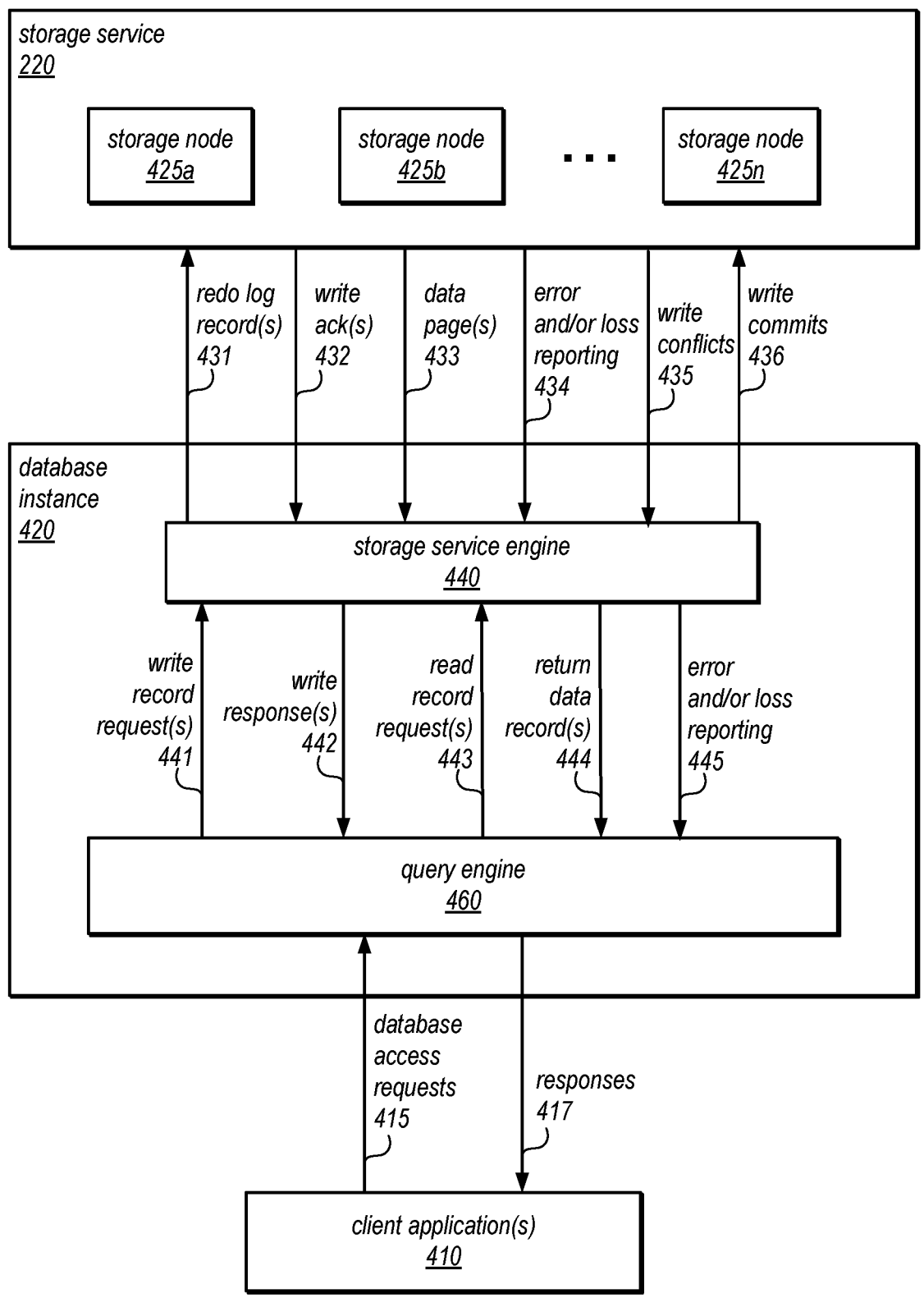
FIG. 4 is a block diagram illustrating the interactions between a database service and separate storage service, according to some embodiments.

FIG. 4 is a block diagram illustrating various interactions to handle database client requests, according to some embodiments. In this example, one or more client application(s) 410 may store data to one or more databases maintained by a database system that includes a database instance 420 and a storage service 220. In the example illustrated in FIG. 4, database instance 420 includes query engine 460 and storage service engine 440 (which serves as the interface between storage service 220 and query engine 460). In some embodiments, query engine 460 may perform functions such as query parsing, optimization and execution, and transaction and consistency management component, and/or may store data pages, transaction logs and/or undo logs.

In this example, one or more client application(s) 410 may send database access requests 415 (which may include read and/or write requests targeting data stored on one or more of the storage nodes 435a-435n) to query engine 460, and may receive responses 417 from query engine 460 (e.g., responses that include write acknowledgements and/or requested data). Each database access request 415 that includes a request to write to a page may be parsed and optimized to generate one or more write record requests 441, which may be sent to storage service engine 440 for subsequent routing to storage service 220. In this example, storage service engine 440 may generate one or more redo log records 431 corresponding to each write record request 441, and may send them to specific ones of the storage nodes 435 of storage service 220. Storage service 220 may return a corresponding write acknowledgement 423 for each redo log record 431 to database instance 420 (specifically to storage service engine 440). Storage service engine 440 may pass these write acknowledgements to query engine 460 (as write responses 442), which may then send corresponding responses (e.g., write acknowledgements) to one or more client applications 410 as one of database responses 417.

In this example, each database access request 415 that includes a request that causes a read of a data page may be parsed and optimized to generate one or more read record requests 443, which may be sent to storage service engine 440 for subsequent routing to storage service 220. In this example, storage service engine 440 may send these requests to specific ones of the storage nodes 435 of storage service 220, and storage service 220 may return the requested data pages 433 to database instance 420 (specifically to storage service engine 440). Storage service engine 440 may send the returned data pages to the query engine 460 as return data records 444, and query engine 460 may then send the data pages to one or more client application(s) 410 as database responses 417.

In some embodiments, various error and/or data loss messages 434 may be sent from storage service 220 to database instance 420 (specifically to storage service engine 440). These messages may be passed from storage service engine 440 to query engine 460 as error and/or loss reporting messages 445, and then to one or more client application(s) 410 along with (or instead of) a database response 417.

In some embodiments, the APIs 431-434 of storage service 220 and the APIs 441-445 of storage service engine 440 may expose the functionality of the storage service 220 to database instance 420 as if database instance 420 were a client of storage service 220. For example, database instance 420 (through storage service engine 440) may write redo log records or request data pages through these APIs to perform (or facilitate the performance of) various operations of the database system implemented by the combination of database instance 420 and storage service 220 (e.g., storage, access, change logging, recovery, and/or space management operations). As illustrated in FIG. 4, storage service 220 may store data blocks on storage nodes 425a-425n, each of which may have multiple attached SSDs. In some embodiments, storage service 220 may provide high durability for stored data block through the application of various types of redundancy schemes.

Note that in various embodiments, the API calls and responses between database instance 420 and storage service 220 (e.g., APIs 431-434) and/or the API calls and responses between storage service engine 440 and query engine 460 (e.g., APIs 441-445) in FIG. 4 may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of Web-based services. REST is an architectural style for distributed hypermedia systems. A RESTful API (which may also be referred to as a RESTful web service) is a web service API implemented using HTTP and REST technology. The APIs described herein may in some embodiments be wrapped with client libraries in various languages, including, but not limited to, C, C++, Java, C #and Perl to support integration with database instance 420 and/or storage service 220.

Figure 5:
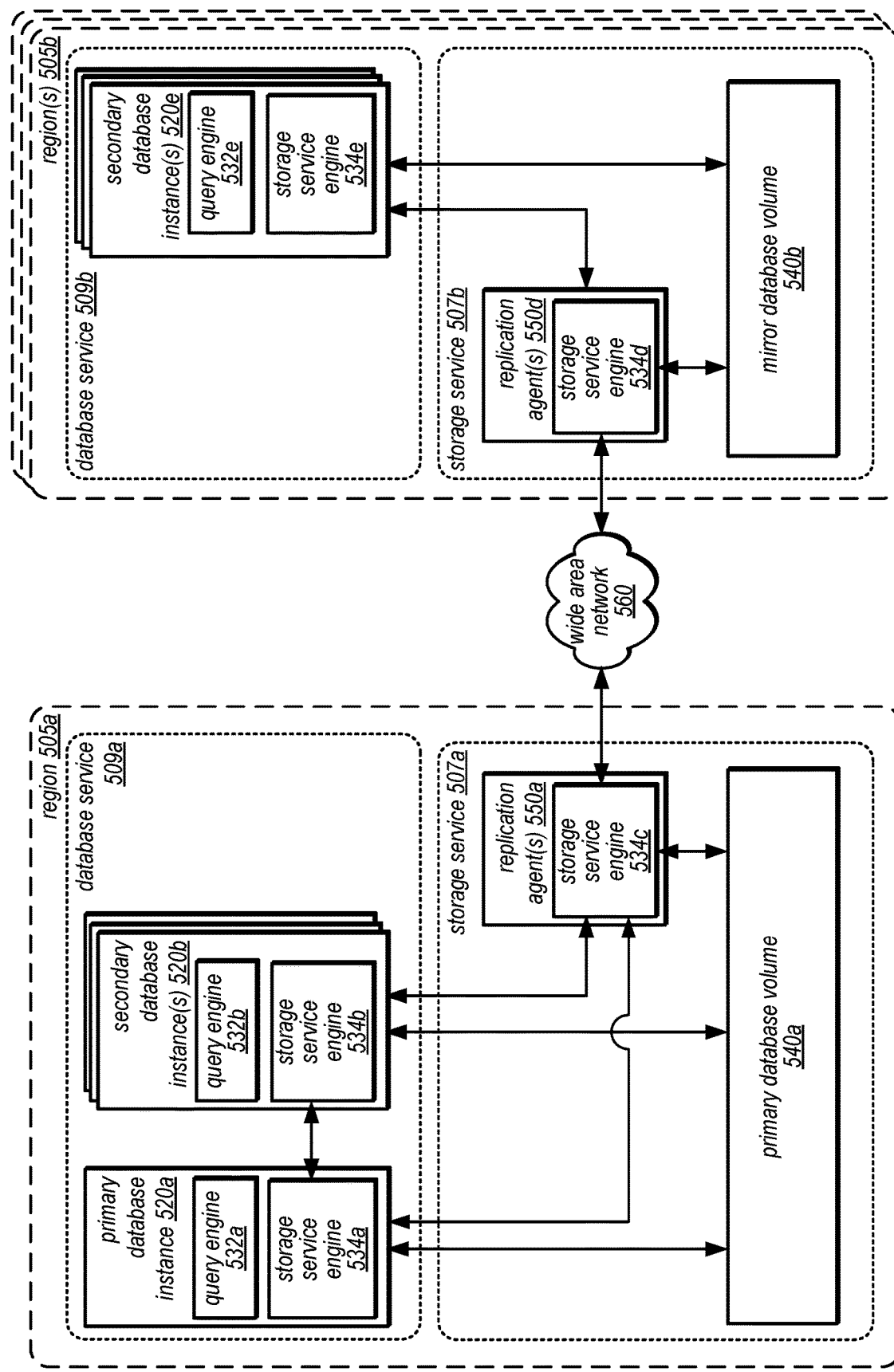
FIG. 5 is a block diagram illustrating cross region replication for a database hosted in a database service, according to some embodiments.

As discussed above with regard to FIGS. 1 and 2, in some embodiments, a database may be replicated according to different techniques for different locations. Replication of changes made by a primary database instance with assigned read-write permissions to a secondary database instance in a same region with read-only permissions may be different than a mirrored copy of the database maintained in a different region. FIG. 5 is a block diagram illustrating cross region replication for a database hosted in a database service, according to some embodiments. Various ones of the components illustrated in FIG. 5 may be implemented via various computer systems (e.g., such as the computer system illustrated in FIG. 9, described below).

In this illustrated example, multiple clusters of one or more database instances may be hosted in respective services in database services 509a and 509b in region 505a and region(s) 505b to provides database services to clients that access the databases in the different regions. It should be noted that, while the illustrated example shows one remote cluster, any number of remote clusters may be employed. Similarly, one or multiple database instances may be implemented within each database service for a database, in some embodiments. Multiple database instances, as discussed above with regard to FIGS. 2-5, such as primary database instance 520a and secondary database instance(s) 520b may be implemented as part of database service 509a to provide access to a database stored in storage service 507a, in primary database volume 540a. Primary database instance 520a may provide read and write capabilities to the database, utilizing query engine 532a and storage service engine 534a, as well as offering additional read capacity via secondary database instances(s) 520b, which includes a respective query engines 532b and storage service engines 534b.

Storage service 507a may also implement a replication agent(s) 550a which may act as a reverse proxy, among other features, to replicate changes made to the database at primary database volume 540a to a mirror database volume 540b stored in storage service 507b in region 505b. Note that other regions may also implement mirror database volumes in respective storage services. Replication agent(s) 550a may implement a storage service engine 534c to perform the various techniques discussed below. Similarly, storage service 507(b) may implement replication agent(s) 540d, which may include storage service engine 534d to perform the below replication techniques while minimizing the time that mirror database volume is unable to be accessed by secondary database instance 520e (via query 532e and storage service engine 534e), in some embodiments. In some embodiments, multiple replication agents may be assigned to replicating changes to database copies (e.g., 2 replication agents for source database and database copy).

In some embodiments, storage service engine 534 may implement a one or more streams of information to assist in synchronizing updates between database volumes and head nodes. For example, storage service engine 534a may send change notifications of cache invalidation messages, and/or changes to system metadata, such as data structures that indicate the layout and/or definition of the database and/or in-flight transaction data, such as the states of and entries of active transactions at primary database instance 520a) to storage service engine 534b of secondary database instance 520b as well as to storage service engine 534c of replication agent 550a. Replication agent(s) 550a can function as an additional replica node of the database in database service 509a, in some embodiments. Replication agent 550 may forward the change notifications received from the storage service engine 534a to the storage service engine 534d of the replication agent 550d over wide area network 560 (which may be a public network, in some embodiments) where the replication agent 550d may function as single writer for mirror database volume 540b. In this way, performance of the database in database service 509a is minimally degraded yet the access to mirror database volume 540b can provide a consistent read view of the database with minimal latency, in some embodiments.

As the communications between replication agents may occur over wide area network 560, various security protocols may be implemented. For example, SSL or other TLS security techniques may be implemented to safeguard or otherwise encrypt data being transmitted over wide area network 560 (e.g., log records or pages as discussed below).

Figure 6:
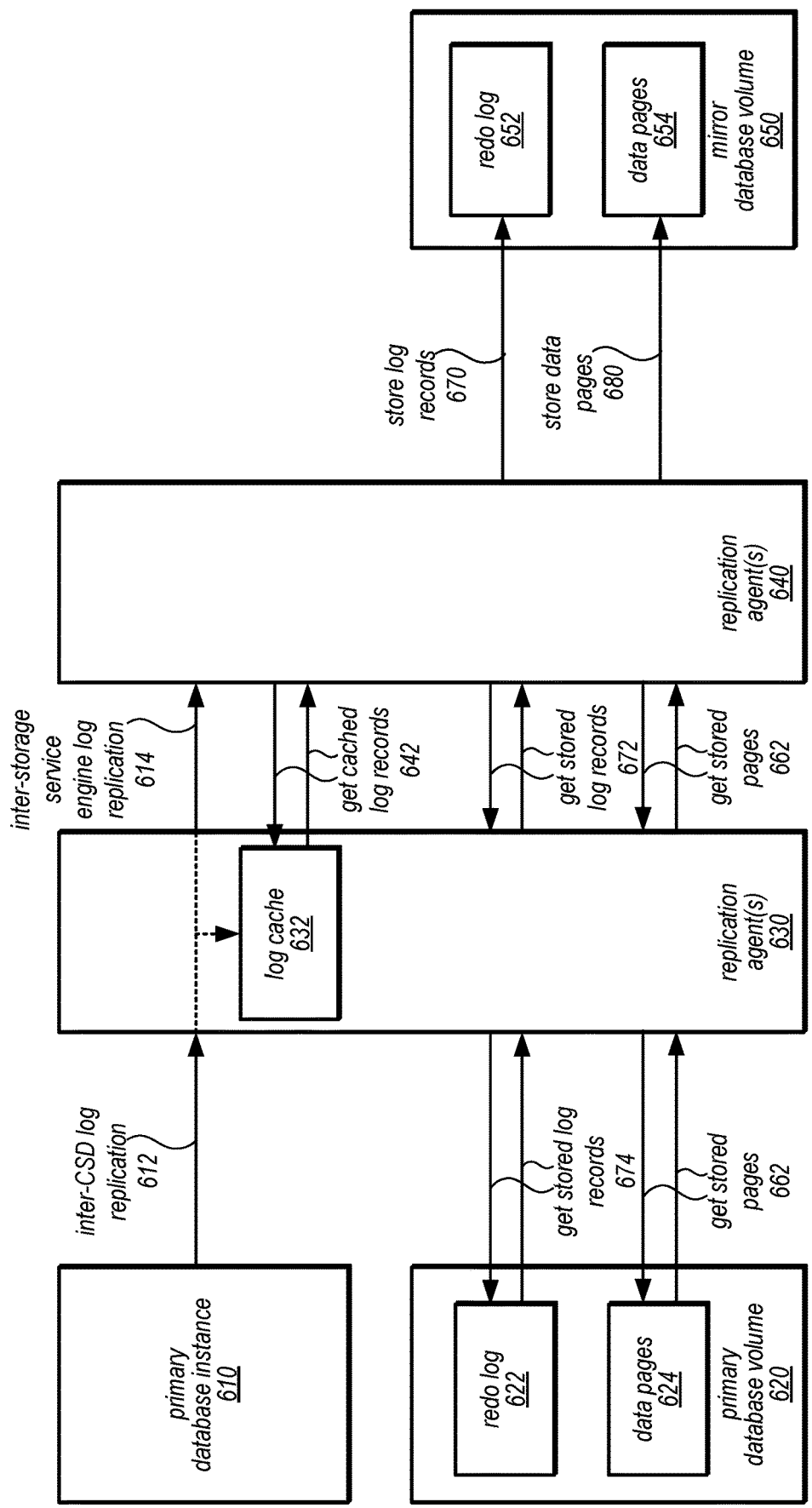
FIG. 6 is a logical block diagram illustrating log replication for cross region replication for a database hosted in a database service, according to some embodiments.

FIG. 6 is a logical block diagram illustrating log replication for cross region replication for a database hosted in a database service, according to some embodiments. As noted above, a primary head node, like primary database instance 610 may generate redo log records to describe updates or other changes to a database, such as the database stored in primary database volume 620. Primary database instance 610 may perform inter-storage service engine replication 612, in some embodiments, to communicate or send redo log records as they are generated to other storage service engines, such as a storage service engine implemented as part of replication agent 630. In some embodiments, replication agent(s) 630 may push the inter-storage service engine log replication communications 614 to replication agent(s) 640 (which may handle processing of the stream of log records using a storage service engine implemented at replication agent(s) 640), in some embodiments, while in other embodiments, replication agent(s) 640 may poll for these communications (not illustrated).

In some embodiments, replication agent(s) 630 may implement a log cache 632 which may store log records from the log stream. In this way, if communication failures (e.g., dropped packets, network partitions) or other interruptions cause some log records to be missed in inter-storage service engine log replication 614, then log cache 632 may be able to supply the missing records without having to go to other locations. For example, replication agent(s) 640 may be able get cached log records 642 from log cache 632, in some embodiments. Although not illustrated, in some embodiments, replication agent(s) 640 may implement a cache of log records (e.g., for one or multiple secondary database engine head nodes to access in order to perform other operations).

Replication agent(s) 630 may also be able to access redo log 622 primary database volume 620 if the cache 632 would not have the missing redo log records. For example, replication agent(s) 640 may be performing a catch-up or re-mirror technique in order to obtain missing updates that were not received as part of the inter-storage service engine log replication stream, in some embodiments. Instead, replication agent(s) 640 may submit a request to get stored log records 662 which replication agent(s) 630 may perform, as indicated at 664, in order to obtain the request log records from primary database volume 620.

Similarly, replication agent(s) 630 may also be able to request 662 data pages from data pages 624 stored as part of primary database volume 620. For example, replication agent(s) 640 may be performing a catch-up or re-mirror technique in order to obtain missing updates that were not received as part of the inter-storage service engine log replication stream, not present in the log cache 632, or redo log 622, in some embodiments.

Replication agent(s) 640 (or 630) may store log records 670 to update a redo log 652 of a mirror database volume 650 or store data pages 680 to update the data pages 654 of mirror database volume 650 in different circumstances. For example, a threshold determination as to the number of changes (e.g., amount of data, number of operations or records, number of portions of the database to access, etc.) may determine whether replication agent 640 utilizes inter-storage service engine log replication 614, cached log records 642, stored log records 672, or data pages 662, in some embodiments. In some scenarios, various techniques for performing the updates, such as the techniques to minimize disruption of data page updates, as discussed below with regard to FIG. 10 maybe performed by replication agent 640 (or 630). In some embodiments, replication agent(s) 640 may also implement a log cache (not illustrated) for performing updates (or providing updates to a secondary head node that accesses mirror database volume 650).

While the techniques discussed above can be applied to changing query engine versions across multiple database instances, further considerations can be made for different replication techniques, like those of cross-region replication as discussed above with regard to FIGS. 5-6. FIGS. 7A-7D are logical block diagrams illustrating interactions to upgrade a version of a query engine at database instances that provide access to a database hosted in a database service, according to some embodiments.

Figure 7A:
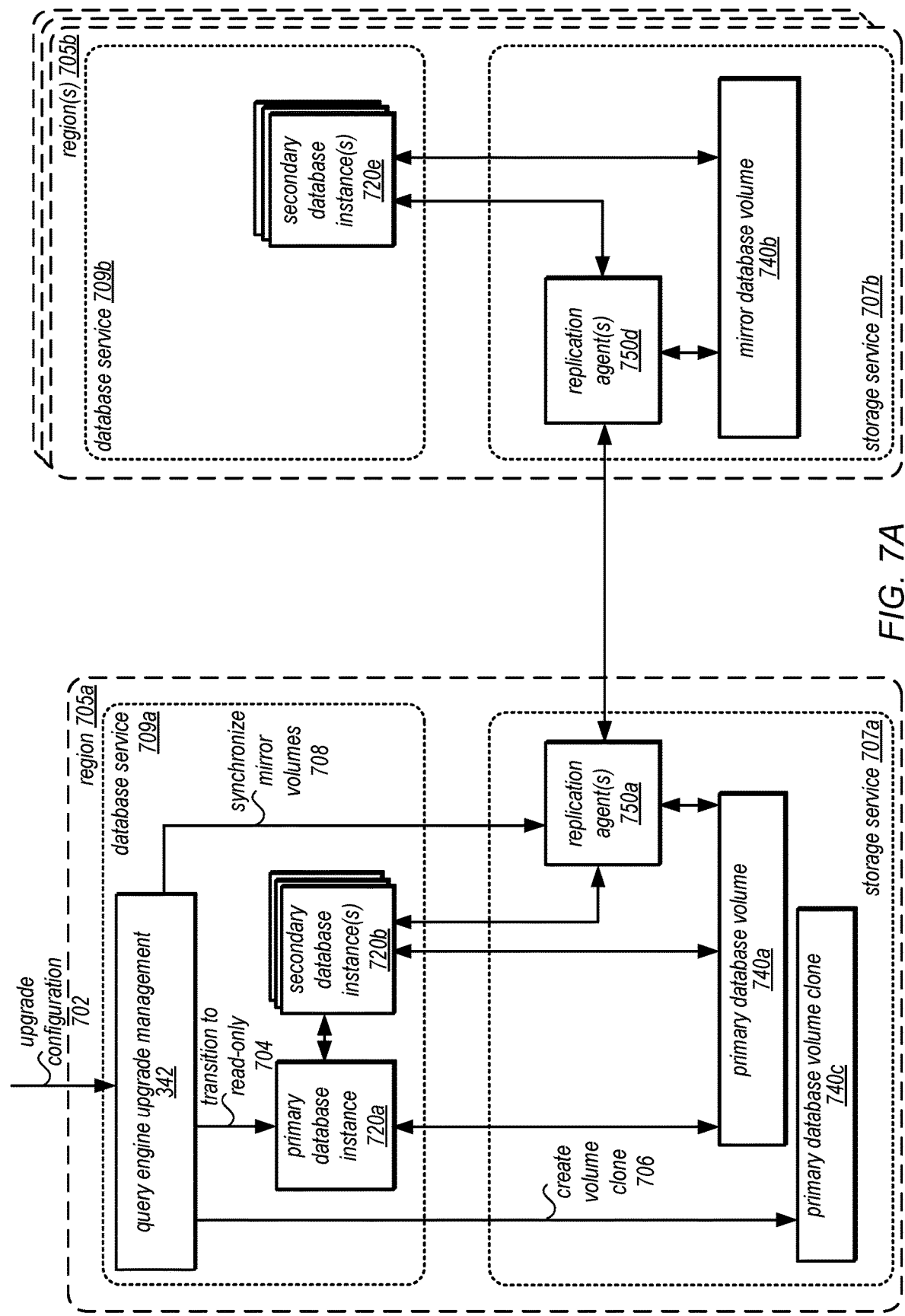
FIGS. 7A-7D are logical block diagrams illustrating interactions to upgrade a version of a query engine at database instances that provide access to a database hosted in a database service, according to some embodiments.

FIG. 7A depicts primary database instance 720a and secondary database instance(s) 720b may be implemented as part of database service 709a to provide access to a database stored in storage service 707a, in primary database volume 740a. Primary database instance 720a may provide read and write access to the database (or portion thereof) stored in primary database volume 740a, utilizing a query engine and a storage service engine, as well as offering additional read capacity via secondary database instances(s) 720b, which includes respective query engines and storage service engines. Also depicted in FIG. 7A, is a cross-region mirror(s) of the database in region(s) 705b, using secondary database instance(s) 720e. Before a version change of a query engine, storage service 707a may, like in FIGS. 5 and 6 discussed above implement replication agent(s) 750a to replicate changes made to the database at primary database volume 740a to mirror database volume 740b stored in storage service 707b in region 705b. Replication agent(s) 750a may implement a storage service engine 734c to perform the various techniques discussed below. Similarly, storage service 707(b) may implement replication agent(s) 750d, which may include storage service engines to perform the below replication techniques while minimizing the time that mirror database volume is unable to be accessed by secondary database instance 720e (via query engines and storage service engines), in some embodiments.

As indicated at 702, a request to configure an update or otherwise provide an update configuration from a current version of the query engine to a different version of the query engine. This update may increment or increase a version number of the query engine, in some embodiments. In some embodiments, the upgrade configuration 702 may specify a time period (e.g., a range of time, window of time, or specific starting time) for performing the change from the current version to the different version of the query engine. In some embodiments, the time period may correspond to a time zone for the region in which the primary database instance is located (e.g., in region 705a). In some embodiments, the upgrade configuration 702 may specify a particular one of many available versions of the query engine.

As indicated at 704, query engine upgrade management may instruct 704 primary database instance 720a to transition to a read-only database instance. For example, primary database instance may complete in-flight requests that include writes (e.g., transactions or other write requests). In some embodiments, completion may have to occur within a period of time, otherwise the writes may fail.

In some embodiments, query engine upgrade management 342 may create 706 a volume clone 740c of primary database volume 740a, which may provide a copy of the primary database volume 740a. For example, storage service 707a may support various different volume cloning techniques, including copy-on-write techniques or creation of an entirely separate copy of primary database volume 740a. In some embodiments, other backup features implemented by storage service 707 may be utilized to create (either physically or logically) primary database volume clone 740c. For example, a backtrack or flashback feature, which utilizes a log of changes (e.g., the redo log discussed above) to provide the ability to provide access to a state of the database as of a certain time, may be used to create the primary database volume clone 740c by adding a backtrack point that preserves log records to access primary database volume 740c at a specific point in time corresponding to the creation of the primary database volume clone.

Because writes may no longer be supported, primary database volume 740 may reach a frozen state. Secondary database instance(s) 720b may continue to provide read-only access to the primary database volume 740a at the frozen state. Additionally, to ensure that mirror database volumes also reach a frozen state, query engine upgrade management 342 may instruct 708 replication agent(s) 750a to ensure that mirror database volume 740b becomes synchronized with primary database volume 740a (e.g., ensures confirmation of updates replicated between replication agent(s) 750a and 750d). Although not illustrated, in some embodiments, replication agent(s) 750a may be instructed to disconnect or otherwise stop communicating writes with other regions that have a mirror database volume. In some embodiments, a time limit may be set on synchronizing mirror database volumes which if exceeded may cause the mirror database volume to be disconnected without completing synchronization. In this way, a lagging region may not hold up performance of the upgrade. In some embodiments, a snapshot or other backup of the lagging mirror database volumes may be taken and used if, in the event of an unsuccessful upgrade, a current version of the lagging mirror database volumes does not indicate whether a successful upgrade was performed at the secondary database instances in the mirror region.

Figure 7B:
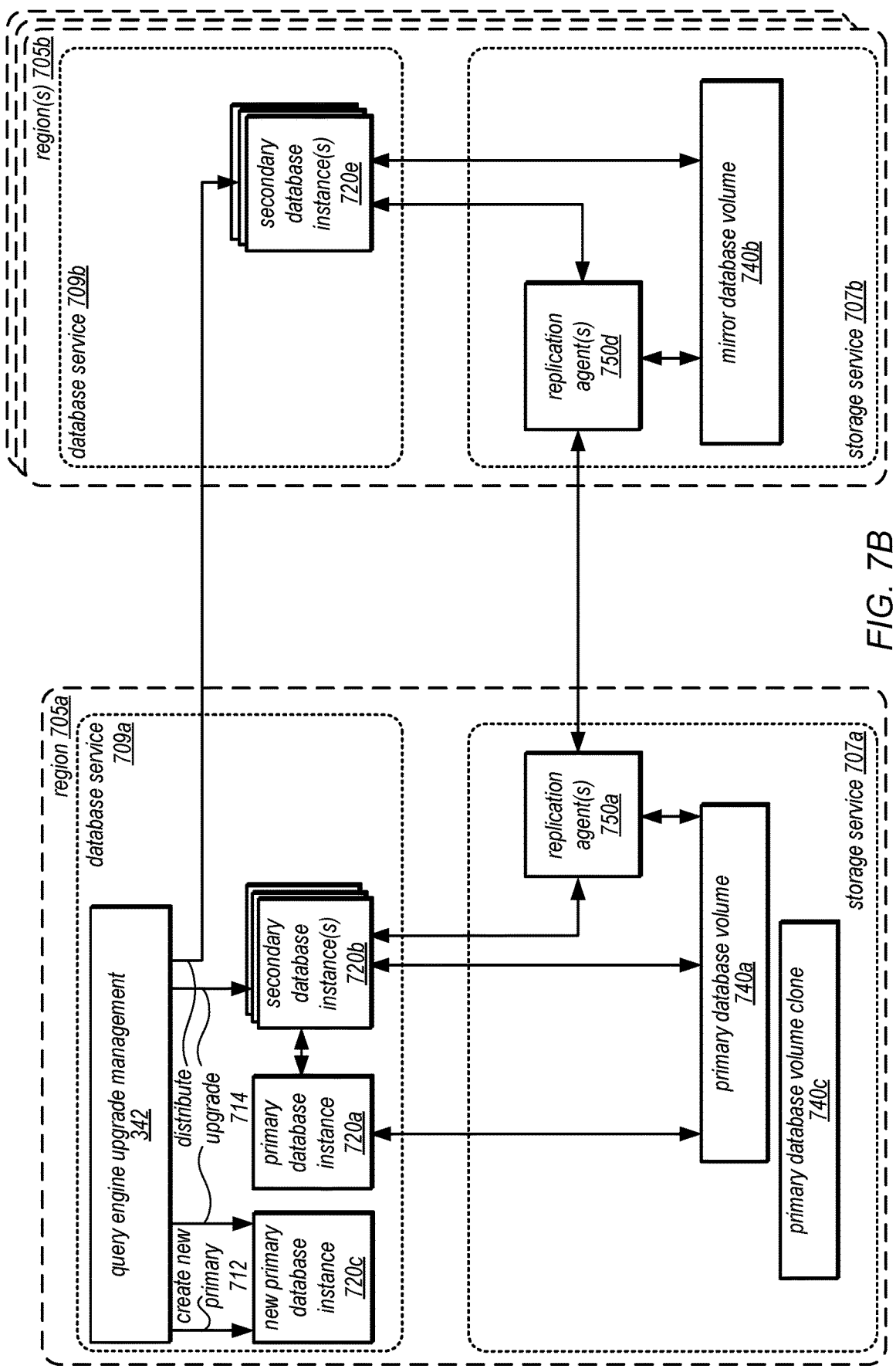

As illustrated in FIG. 7B, query engine upgrade management 342 may create a new primary database instance 720c. This new primary database instance 720c as well as other secondary database instances 720b and 720e may also receive a distribution of the upgrade to the different version of the query engine. An instruction or command to install the new version of the query engine at new primary database instance 720c may be provided (not illustrated), which may initiate an executable or other set of instructions that were distributed at 714. Depending on the query engine and version of the query engine being installed, changes may also be made to primary database volume clone 740c (e.g., to update system metadata).

Figure 7C:
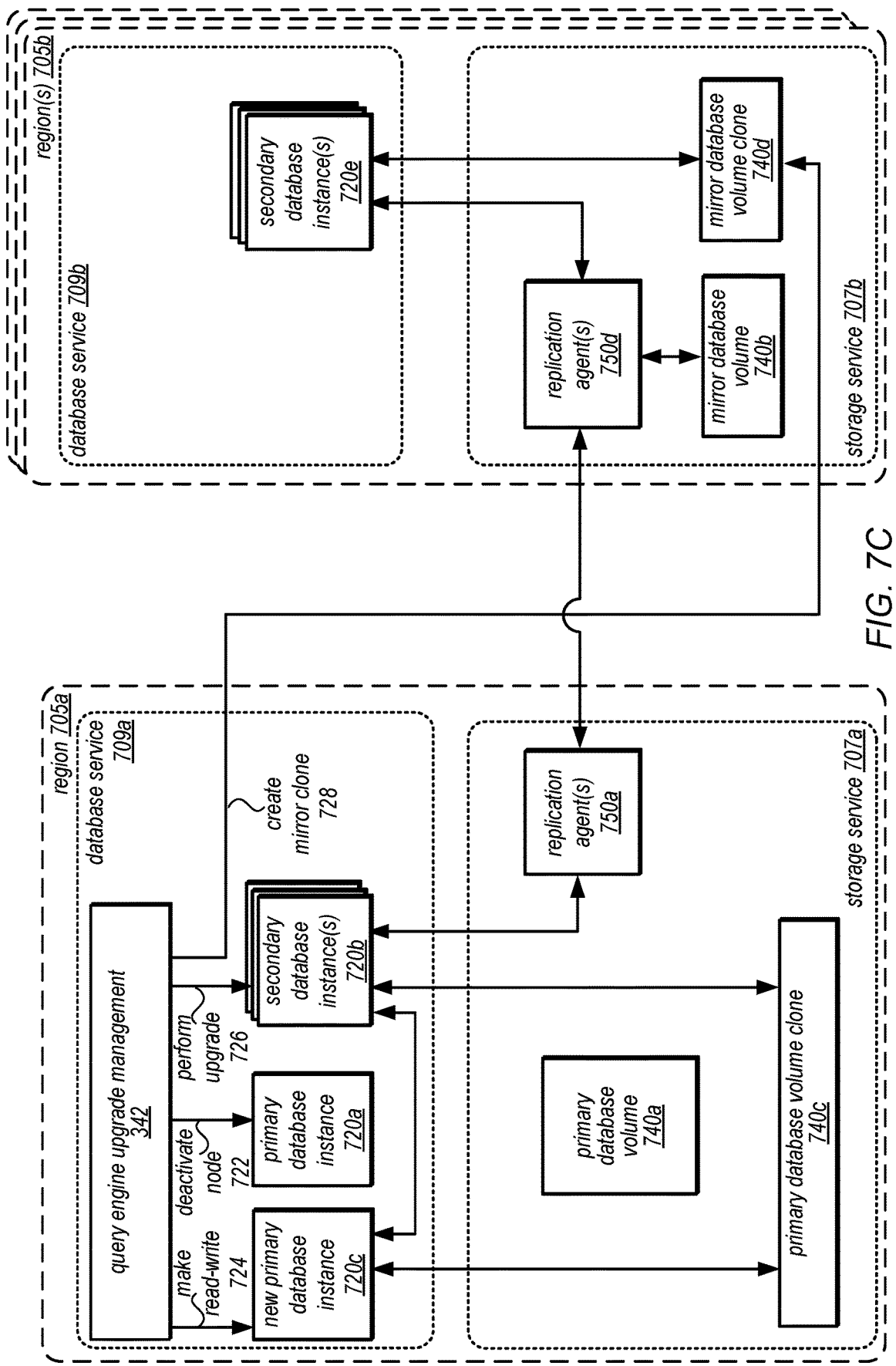

As illustrated in FIG. 7C, successful completion of the version installation at new primary database instance 720c may trigger a transition to using the new primary database instance 720c to provide access to the database. For example, a request or other instruction to make 724 the new primary database instance 720c a read-write node (using primary database volume clone 740c may be sent. Primary database instance 720a may be deactivated, as indicated at 720, and as indicated at 726, an instruction may be made to in-region secondary database instances 720b to perform the upgrade to the different version of the query engine and use the primary database volume clone 740c to provide read-only access to the database. To begin the transition in mirror volume regions, an instruction or other request 728 to create a mirror clone 740d may be made by query engine upgrade management 342 to other storage services (e.g., storage service 707b) which can then be used to provide a frozen state of the database to handle database access requests from secondary database instances. In those embodiments where replication is stopped, replication may resume to begin to synchronize mirror database volume with the primary database volume clone 740c, including obtaining changes as a result of the upgraded version of the query engine and any writes that may be performed using new primary database instance 720c.

Figure 7D:
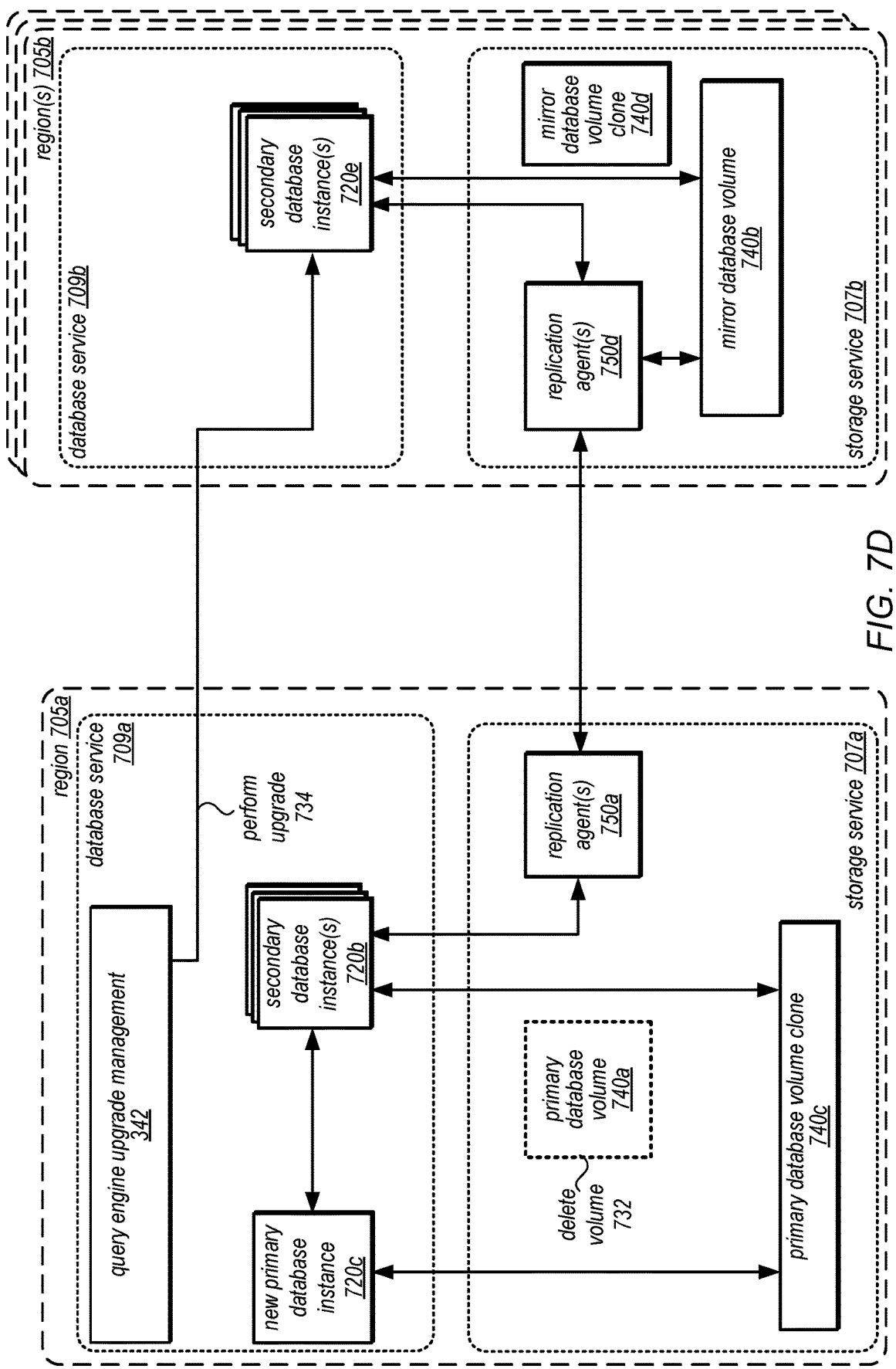

As illustrated in FIG. 7D, once mirror database volume 740b is updated to support database access requests (e.g., system metadata changes and some (or all)) intervening database updates are performed, then query engine upgrade management 342 may send a request or instruction 734 to secondary database instance(s) 720e to perform the upgrade using the distributed upgrade instructions provided in FIG. 7B. Upon completion of the upgrade, secondary database instance(s) 720e can use the database volume clone 740b again to perform database access requests and the mirror database volume clone 740d can be discarded.

The above techniques also support a no-downtime upgrade failure technique. For example, instead of a successful installation of the different version of the query engine, as discussed with regard to FIG. 7C, an upgrade failure can abort the upgrade with no downtime by reverting the role of primary database instance 720a to have read-write permissions and remove primary database volume clone 740c. Then, replication between replication agent(s) 750a and 750d can be reconnected and resumed. In this way, an upgrade failure does not disrupt client application connections to either primary region 705a or secondary regions 705b.

In some embodiments, query engine upgrade management 342 may detect or determine whether an upgrade between versions of a query engine causes an interoperability issue, compatibility issue, or other error scenario between a current and to be installed version of a query engine. For example, a manifest (e.g., a Javascript Object Notation (JSON) document) or other description of version changes, library changes, or other differences of a version can be compared with a respective manifest (or other form of version notes) to determine whether an interoperability issue, compatibility issue, or other error scenario exists (or is likely to exist). In some embodiments, this can be specified as part of an upgrade configuration 702, allowing a user (or other system) to choose whether to perform a query engine version upgrade using the techniques depicted in FIGS. 7A-7D. For those scenarios where the version upgrade is not determined to have an error scenario, then query engine management 342 may distributed and instruct installation of the different version of the query engine at the different database instances. In some embodiments, a specified time period (e.g., in the upgrade configuration 702) for this type of upgrade technique may also be followed.

Figure 8:
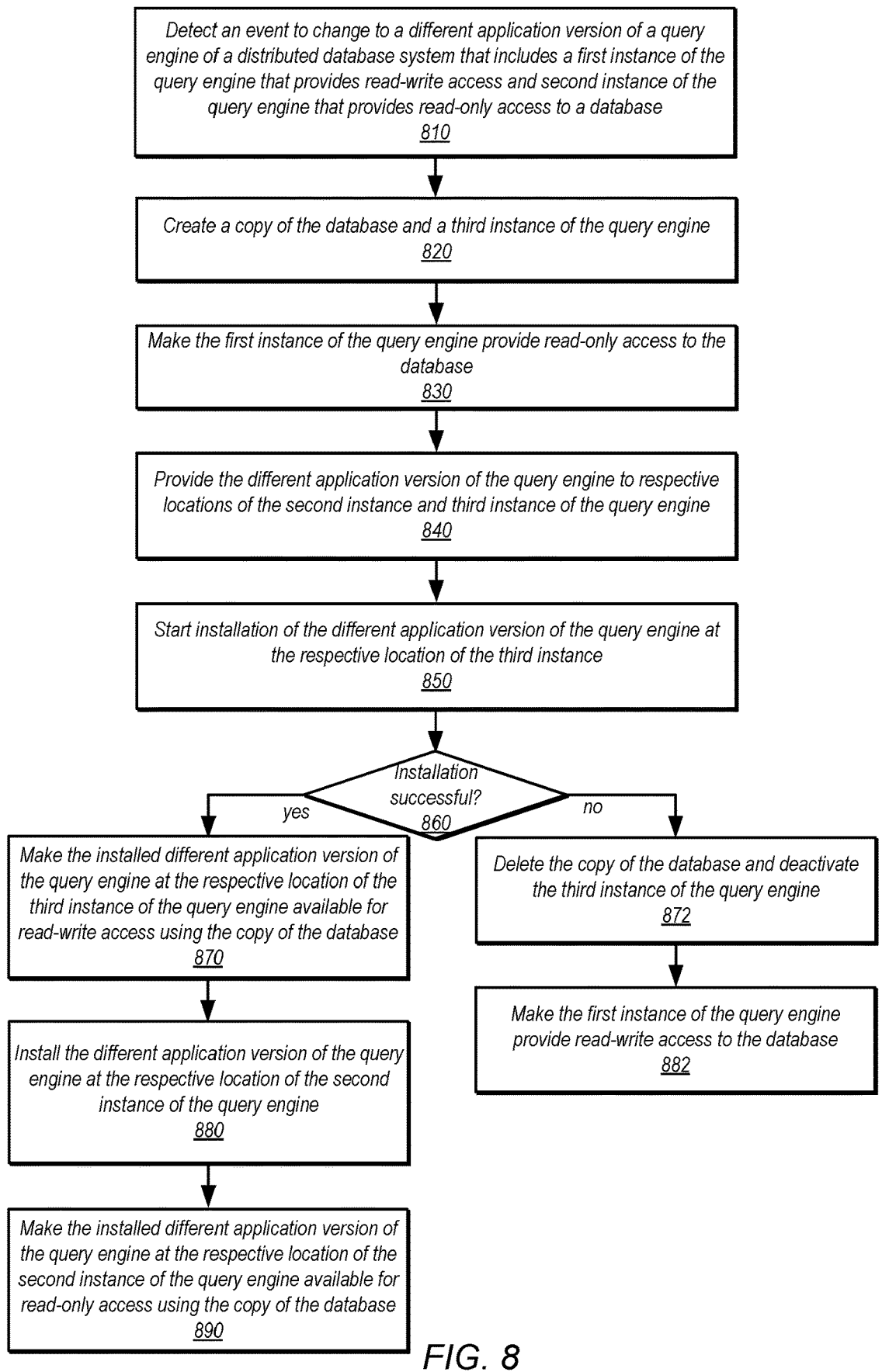
FIG. 8 is a high-level flowchart illustrating various methods and techniques to implement minimizing connection loss when changing database query engine versions, according to some embodiments.

The database service and storage service discussed in FIGS. 2 through 7D provide examples of a system that may implement minimizing connection loss when changing database query engine versions. As noted above with regard to FIGS. 1A-1D, these techniques may also be implemented for other distributed databases, which do not have cross-region replication but may have multiple different query engines which may have versions changed. Various other types of distributed database systems (as discussed above with regard to FIGS. 1A-1D) may implement these techniques. FIG. 8 is a high-level flowchart illustrating various methods and techniques to implement minimizing connection loss when changing database query engine versions, according to some embodiments. Various different systems and devices of a distributed database system may implement the various methods and techniques described below, either singly or working together. For example, a control plane component of a distributed database system and/or a database instance may implement the various methods. Alternatively, a combination of different systems and devices may implement these techniques. Therefore, the above examples and or any other systems or devices referenced as performing the illustrated method, are not intended to be limiting as to other different components, modules, systems, or configurations of systems and devices.

As indicated at 810, an event to change to a different application version of a query engine of a distributed database system may be detected, in some embodiments. The distributed database system may include a first instance of the query engine that provides read-write access (e.g., a primary database instance) and a second instance of the query engine (e.g., a secondary database instance, located in region or out of region) that provides read-only access to the database. The detected event may be the occurrence of a time period specified in an upgrade configuration, similar to that discussed above with regard to FIG. 7A or a request to perform a change in version of the query engine. The different application version may be explicitly specified (e.g., by an identifier or location of an image, file, or other executable to install the different application version), in some embodiments. In other embodiments, the "next" or some other automatically determined version of the query engine may be chose.

Although not illustrated in FIG. 8, in some embodiments, a determination may be made as to whether the different application version causes an error scenario with current versions of the query engine at the instances in the distributed database system. If not, then a different upgrade technique may be performed, that installs the different application version of the query engine at the respective locations of the database instances can be performed, which may minimally (or not at all) disrupt connections with the database instances.

As indicated at 820, a copy of the database and a third instance of the query may be created, in some embodiments. For example, a new host system may be identified and provisioned or otherwise allocated for hosting the third instance. Then, a current version of the query engine may be installed at the new host system. As noted above, different techniques for creating the copy of the database may be implementing, including the creation of an entirely new copy of the database, using a copy-on-write technique to create a partial copy that points to the current database, or a flashback, backtrack, or other backup technique.

As indicated at 830, the first instance of the database may be made to provide read-only access to the database, in some embodiments. For example, a transition technique that completes in-flight (e.g., in-process) transactions, queries, write or other update requests already received or accepted at the first instance may be performed while rejecting subsequent write requests.

As indicated at 840, the different application version of the query engine may be provided to respective locations of the second instance and third instance of the query engine, in some embodiments. Executables or other instructions to perform the change to the different application version may be uploaded, stored, or otherwise made available to host systems or other components that are the respective locations of the second and third instances of the query engine.

As indicated at 850, installation of the different application version of the query engine may be started at the respective location of the third instance, in some embodiments. For example, a command or other instruction may be sent to the host system to initiate the executable. A determination may be made, as indicated at 860, as to whether the installation is successful at the third instance.

If an error or other failure makes the installation unable to complete, for instance, then a determination may be made that the installation was not successful. As indicated at 872, the copy of the database may be deleted or otherwise removed and the third instance of the query engine may be deactivated (or otherwise removed). Then, as indicated at 882, the first instance of the query engine may be made to provide read-write access to the database (using the original/current copy), in some embodiments.

If no error or other failure makes the installation fail to complete, then as indicated at 870, the installed different application version of the query engine at the respective location of the third instance of the query engine may be made available for read-write access using the copy of the database, in some embodiments. In some embodiments, the first instance of the query engine may be deactivated, in some embodiments.

As indicated at 880, the different application version of the query may be installed at the respective location of the second instance of the query engine, in some embodiments. For example, a request or other instruction may be sent to the second instance of the database. Then, as indicated at 890, the different installed application version of the second instance of the query engine may be made available for read-only access using the copy of the database, in some embodiments.

The methods described herein may in various embodiments be implemented by any combination of hardware and software. For example, in one embodiment, the methods may be implemented on or across one or more computer systems (e.g., a computer system as in FIG. 8) that includes one or more processors executing program instructions stored on one or more computer-readable storage media coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 9:
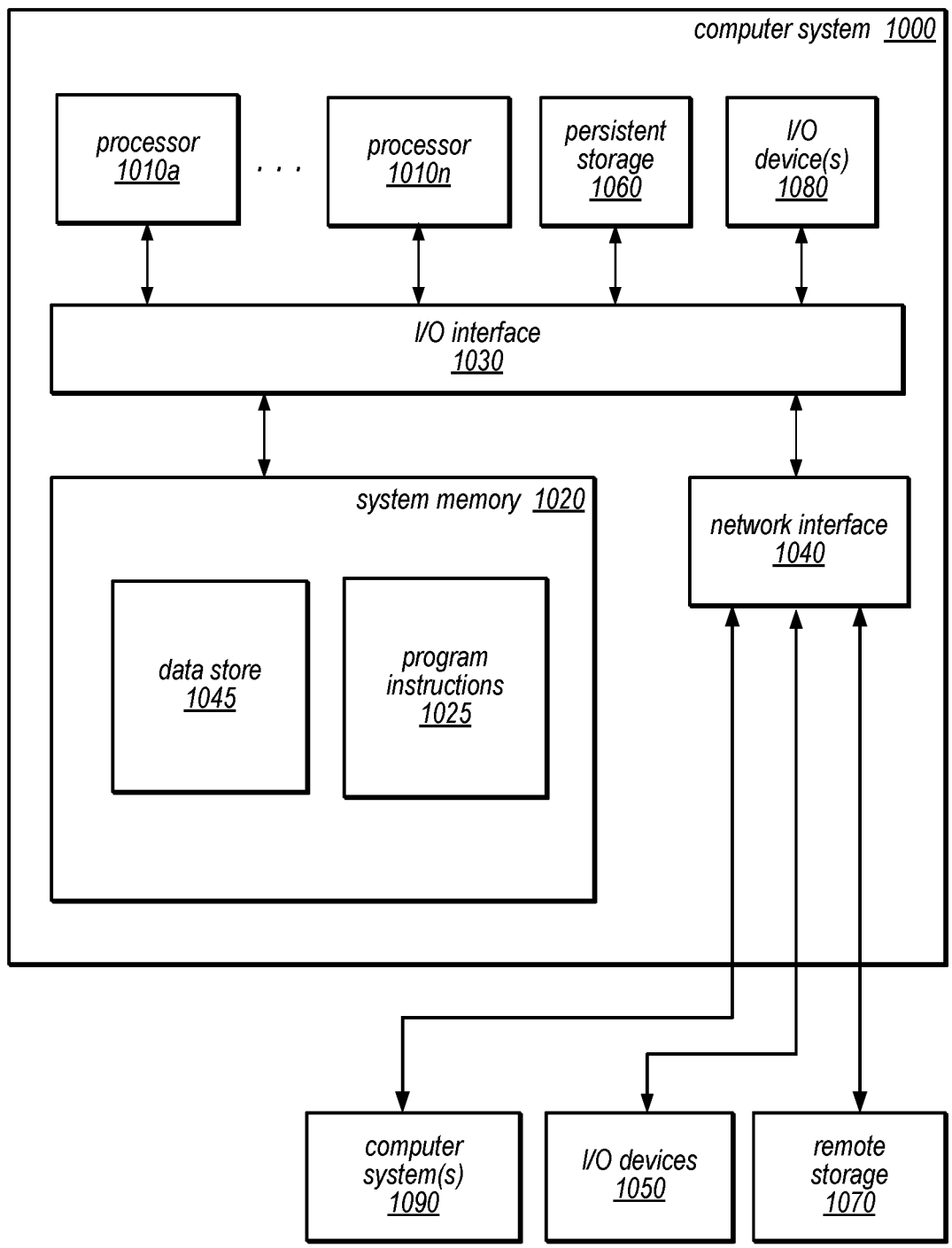
FIG. 9 is a block diagram illustrating an example computer system, according to various embodiments.

FIG. 9 is a block diagram illustrating an example computer system, according to various embodiments. For example, computer system 1000 may implement a read-write (or master/leader/primary) database instance, a read-only node (or read replica/secondary) database instance, replication agents, or storage nodes of a separate distributed storage system that stores database data, in various embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the database systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that may store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g., SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In one embodiment, I/O interface 1030 may coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems 1090 (which may implement one or more storage system server nodes, primary nodes, read-only node nodes, and/or clients of the database systems described herein), for example. In addition, network interface 1040 may allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a read-write node and/or read-only nodes within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A web service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
   a plurality of computing devices, respectively comprising at least one processor and a memory, that implement a database service, wherein the database service is configured to: detect an event to upgrade a version of a query engine that provides access to a database hosted by the database service;
   determine that a version difference caused by the upgrade to the version of the query engine creates an error scenario between a primary instance of the query engine that provides read-write access to the database and a secondary instance that provides read-only access to the database;
   create a new copy of the database from a current copy of the database and a new primary instance of the query engine to provide access to the database using the new copy of the database;
   cause the primary instance of the query engine to provide read-only access to the database;
   distribute respective executables to perform the upgrade to the version of the query engine to respective locations of the secondary instance of the query engine and the new primary instance of the query engine;
   start execution of the respective executable to perform the upgrade to the version of the query engine at the respective location of the new primary instance of the query engine; and
   after successful performance of the upgrade to the version of the query engine at the respective location of the new primary instance of the query engine:
      make the upgraded version of the query engine at the respective location of the new primary instance of the query engine available for read-write access using the new copy of the database;
      cause execution of the respective executable to perform the upgrade to the version of the query engine at the respective location of the secondary instance of the query engine;
      make the upgraded version of the query engine at the respective location of the secondary instance of the query engine available for read-only access using the new copy of the database; and
      delete the primary instance of the query engine and the current copy of the database.

2. The system of claim 1,
   wherein the primary instance, the secondary instance, the current copy of the database, and the new copy of the database are implemented in a primary region for the database service of a provider network, wherein a further secondary instance that provides read-only access to the database is implemented in a secondary region of the provider network using a mirror copy of the database implemented in the secondary region of the provider network, and wherein the mirror copy of the database is replicated using the current copy of the database;
   wherein the database service is further configured to:
      distribute the executable to perform the upgrade to the version of the query engine to the further secondary instance of the query engine in the secondary region;
   wherein after the successful performance of the upgrade to the version of the query engine at the respective location of the new primary instance of the query engine, the database service is further configured to:
      create a different mirror copy in the secondary region to use for read-only access to the database in the secondary region;
      cause execution of the executable to perform the upgrade to the version of the query engine to the further secondary instance of the query engine in the secondary region; and
      after the upgrade to the version of the query engine of the further secondary instance, make the further secondary use the mirror copy of the database.

3. The system of claim 1, wherein the event is a period of time specified in an upgrade configuration received at the database service.

4. The system of claim 1, wherein the database service is a relational database service implemented as part of a provider network and wherein the current copy of the database and the new copy of the database are stored in a separate storage service implemented as part of the provider network.

5. A method, comprising:
   detecting, by a distributed database system, an event to change to a different application version of a query engine of the distributed database system, wherein the distributed database system comprises a first instance of a query engine that provides read-write access to a database and a second instance of the distributed database system that provides read-only access to the database;
   creating, by the distributed database system, a copy of the database and a third instance of the query engine to provide access to the database using the copy of the database;

causing, by the distributed database system, the first instance of the query engine to provide read-only access to the database;

providing, by the distributed database system, the different application version of the query engine to respective locations of the second instance of the query engine and the third instance of the query engine;

starting, by the distribute database system, installation of the different application version of the query engine at the respective location of the third instance of the query engine; and after successfully installing the different application version of the query engine at the respective location of the third instance of the query engine:

making, by the distributed database system, the installed different application version of the query engine at the respective location of the third instance of the query engine available for read-write access using the copy of the database;

installing, by the distributed database system, the different application version of the query engine at the respective location of the second instance of the query engine; and making, by the distributed database system, the installed different application version of the query engine at the respective location of the second instance of the query engine available for read-only access using the copy of the database.

6. The method of claim 5,
wherein the first instance, the second instance, the database, and the copy of the database are implemented in a primary region of a provider network, wherein a further instance that provides read-only access to the database is implemented in a secondary region of the provider network using a mirror copy of the database implemented in the secondary region of the provider network, and wherein the mirror copy of the database is replicated using the database;

wherein the method further comprises:
providing the different application version of the query engine to a location of the further instance of the query engine in the secondary region;

wherein after the successful installation of the different application version of the query engine at the respective location of the third instance of the query engine:

creating a different mirror copy in the secondary region to use for read-only access to the database in the secondary region;

causing installation of the different application version of the query engine at the location of the further instance of the query engine in the secondary region; and after the installation of the different application version of the query engine at the respective location of the third instance of the query engine, making the further instance use the mirror copy of the database.

7. The method of claim 5, further comprising:
wherein after the successful installation of the different application version of the query engine at the respective location of the third instance of the query engine, removing the first instance of the query engine.

8. The method of claim 5, further comprising:
for an attempt to upgrade to another version of the query engine prior to the different application version of the query engine:

determining that an attempt to install the other version of the query engine at the first instance of the query engine was not successful;

returning read-write permissions to the first instance of the query engine provide read-write access using the database instead of a different copy of the database created to upgrade to the other version of the query engine; and deleting the different copy of the database.

9. The method of claim 5, further comprising:
for an attempt to upgrade to another version of the query engine prior to the different application version of the query engine:

determining that a version difference caused by the change to the other version of the query engine does not create an error scenario between the first instance of the query engine and the second instance of the query engine;

responsive to the determination that the version difference caused by the change to the different application version of the query engine does not create the error scenario, installing the other version at the respective locations of the first instance of the query engine and the second instance of the query engine.

10. The method of claim 5, wherein the copy of the database is created according to a copy-on-write technique.

11. The method of claim 5,
wherein the first instance, the second instance, the database, and the copy of the database are implemented in a primary region of a provider network, wherein a further instance that provides read-only access to the database is implemented in a secondary region of the provider network using a mirror copy of the database implemented in the secondary region of the provider network, and wherein the mirror copy of the database is replicated using the database;

wherein the method further comprises:
disabling replication between the database and the mirror copy of the database after determining that synchronization of the mirror copy exceeds a time limit.

12. The method of claim 5, wherein the event is a period of time specified in an upgrade configuration received at the distributed database system.

13. The method of claim 5, further comprising determining that a version difference caused by the change to the different application version of the query engine creates an error scenario between the first instance of the query engine and the second instance of the query engine.

14. One or more non-transitory, computer-readable storage media, storing program instructions that when executed on or across one or more computing devices cause the one or more computing devices to implement:

detecting an event to change to a different application version of a query engine of a distributed database system, wherein the distributed database system comprises a first instance of a query engine that provides read-write access to a current copy of a database and a second instance of the distributed database system that provides read-only access to the current copy of the database;

creating a new copy of the database from the current copy of the database and a third instance of the query engine to provide access to the database using the new copy of the database;

causing the first instance of the query engine to provide read-only access to the database;

providing the different application version of the query engine to respective locations of the second instance of the query engine and the third instance of the query engine;
starting installation of the different application version of the query engine at the respective location of the third instance of the query engine; and
after successfully installing the different application version of the query engine at the respective location of the third instance of the query engine:
    making the installed different application version of the query engine at the respective location of the third instance of the query engine available for read-write access using the copy of the database;
    installing the different application version of the query engine at the respective location of the second instance of the query engine;
    making the installed different application version of the query engine at the respective location of the second instance of the query engine available for read-only access using the copy of the database; and
    deleting the first instance of the query engine and the current copy of the database.

15. The one or more non-transitory, computer-readable storage media of claim 14,
    wherein the first instance, the second instance, the database, and the copy of the database are implemented in a primary region of a provider network, wherein a further instance that provides read-only access to the database is implemented in a secondary region of the provider network using a mirror copy of the database implemented in the secondary region of the provider network, and wherein the mirror copy of the database is replicated using the database; and
    wherein the one or more non-transitory, computer-readable storage media, store further program instructions that when executed on or across the one or more computing devices cause the one or more computing devices to further implement:
        providing the different application version of the query engine to a location of the further instance of the query engine in the secondary region;
        wherein after the successful installation of the different application version of the query engine at the respective location of the third instance of the query engine:
            creating a different mirror copy in the secondary region to use for read-only access to the database in the secondary region;
            causing installation of the different application version of the query engine at the location of the further instance of the query engine in the secondary region; and
            after the installation of the different application version of the query engine at the respective location of the third instance of the query engine, making the further instance use the mirror copy of the database.

16. The one or more non-transitory, computer-readable storage media of claim 14, storing further program instructions that when executed on or across the one or more computing devices, causes the one or more computing devices to further implement:
    for an attempt to upgrade to another version of the query engine prior to the different application version of the query engine:
        determining that an attempt to install the other version of the query engine at the first instance of the query engine was not successful;
        returning read-write permissions to the first instance of the query engine provide read-write access using the database instead of a different copy of the database created to upgrade to the other version of the query engine; and
        deleting the different copy of the database.

17. The one or more non-transitory, computer-readable storage media of claim 14,
    wherein the first instance, the second instance, the database, and the copy of the database are implemented in a primary region of a provider network, wherein a further instance that provides read-only access to the database is implemented in a secondary region of the provider network using a mirror copy of the database implemented in the secondary region of the provider network, and wherein the mirror copy of the database is replicated using the database; and
    wherein the one or more non-transitory, computer-readable storage media, store further program instructions that when executed on or across the one or more computing devices cause the one or more computing devices to further implement:
        disabling replication between the database and the mirror copy of the database after determining that synchronization of the mirror copy exceeds a time limit.

18. The one or more non-transitory, computer-readable storage media of claim 14, wherein the event is a period of time specified in an upgrade configuration received at the distributed database system.

19. The one or more non-transitory, computer-readable storage media of claim 14, wherein the distributed database system is a database service offered by a provider network, and wherein the one or more computing devices implement a control plane for the database service.

20. The one or more non-transitory, computer-readable storage media of claim 14, storing further program instructions that when executed on or across the one or more computing devices, causes the one or more computing devices to further implement determining that a version difference caused by the change to the different application version of the query engine creates an error scenario between the first instance of the query engine and the second instance of the query engine.

* * * * *